US012125455B2

(12) United States Patent
Kim et al.

(10) Patent No.: US 12,125,455 B2
(45) Date of Patent: Oct. 22, 2024

(54) DISPLAY DEVICE

(71) Applicant: LG Display Co., Ltd., Seoul (KR)

(72) Inventors: ByungWoong Kim, Gumi-si (KR); JaeKwon Chae, Gumi-si (KR); SeungHyun Cho, Goyang-si (KR); Junsu Kim, Busan (KR); Donghwan Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/456,298

(22) Filed: Aug. 25, 2023

(65) Prior Publication Data

US 2024/0257779 A1 Aug. 1, 2024

(30) Foreign Application Priority Data

Jan. 31, 2023 (KR) ........................ 10-2023-0012955

(51) Int. Cl.
*G09G 3/36* (2006.01)
*G06F 3/041* (2006.01)
(Continued)

(52) U.S. Cl.
CPC ......... *G09G 3/3648* (2013.01); *G06F 3/0412* (2013.01); *G06F 3/04166* (2019.05);
(Continued)

(58) Field of Classification Search
CPC ... G09G 2300/0426; G09G 2310/0291; G09G 3/3696; G09G 2300/0413
See application file for complete search history.

(56) References Cited

U.S. PATENT DOCUMENTS 10,372,257 B2   8/2019  Kim et al.
10,896,644 B2   1/2021  Do et al.
(Continued)

FOREIGN PATENT DOCUMENTS

JP   2016-118767 A   6/2016
JP   2018-072821 A   5/2018
(Continued)

OTHER PUBLICATIONS

European Patent Office, Extended European Search Report, European Patent Application No. 23193596.6, Jan. 26, 2024, nine pages.
(Continued)

*Primary Examiner* — Van N Chow
(74) *Attorney, Agent, or Firm* — Fenwick & West LLP

(57) ABSTRACT

A display device may include a display panel including pixels and at least one common electrode overlapping a portion of the pixels in an active area of the display panel; a gate driver configured to supply a gate signal to the pixels; a source driving integrated circuit configured to supply a data signal to the pixels and configured to supply a common voltage to the common electrode; and a noise compensator circuit configured to receive a plurality of sensing signals from a plurality of sensing lines that are connected to at least one of the display panel, the gate driver, or the source driving integrated circuit, generate a plurality of inverted sensing signals by applying different gain values to signals obtained by inverting phases of each of the plurality of sensing signals, and generate a noise compensation signal based on at least one of the plurality of inverted sensing signals.

19 Claims, 24 Drawing Sheets

(51) Int. Cl.
*G06F 3/044* (2006.01)
*G09G 3/3225* (2016.01)
(52) U.S. Cl.
CPC ............ *G06F 3/0418* (2013.01); *G06F 3/044* (2013.01); *G09G 3/3225* (2013.01); *G09G 2310/08* (2013.01); *G09G 2330/06* (2013.01); *G09G 2330/12* (2013.01); *G09G 2354/00* (2013.01)

(56) References Cited

U.S. PATENT DOCUMENTS

| | | | |
|---|---|---|---|
| 10,955,951 | B2 | 3/2021 | Lee et al. |
| 11,074,890 | B2 | 7/2021 | Takahashi et al. |
| 11,579,728 | B2 | 2/2023 | Kim et al. |
| 2015/0220177 | A1* | 8/2015 | Park ................ G06F 3/044 345/174 |
| 2016/0180781 | A1 | 6/2016 | Kim et al. |
| 2017/0011704 | A1 | 1/2017 | Sung et al. |
| 2017/0229055 | A1* | 8/2017 | Hu .................. G09G 3/2092 |
| 2018/0114506 | A1 | 4/2018 | Takahashi et al. |
| 2018/0321762 | A1* | 11/2018 | Lee ................ G06F 3/0418 |
| 2019/0102015 | A1 | 4/2019 | Kim et al. |
| 2020/0064950 | A1 | 2/2020 | Kim |
| 2020/0202787 | A1 | 6/2020 | Do et al. |
| 2020/0210007 | A1 | 7/2020 | Lee et al. |
| 2022/0187972 | A1 | 6/2022 | Sung et al. |
| 2022/0206663 | A1 | 6/2022 | Kim et al. |
| 2022/0214791 | A1* | 7/2022 | Cho ................ G09G 3/3225 |
| 2022/0412776 | A1* | 12/2022 | Nakajima ........... H03K 17/962 |
| 2023/0134287 | A1* | 5/2023 | Lee ................. G06F 3/0418 345/174 |

FOREIGN PATENT DOCUMENTS

| | | |
|---|---|---|
| JP | 2019-179341 A | 10/2019 |
| JP | 2020-107334 A | 7/2020 |
| JP | 2022-104559 A | 7/2022 |
| KR | 10-2020-0068286 A | 6/2020 |
| KR | 10-2020-0077316 A | 6/2020 |
| KR | 10-2021-0083794 A | 7/2021 |
| KR | 10-2021-0084985 A | 7/2021 |
| KR | 10-2022-0093814 A | 7/2022 |

OTHER PUBLICATIONS

The Japan Patent Office, Office Action, Japanese Patent Application No. 2023-169134, Aug. 27, 2024, 12 pages.

* cited by examiner

DISPLAY DEVICE

CROSS-REFERENCE TO RELATED APPLICATION

This application claims the benefit of and priority to Republic of Korea Patent Application No. 10-2023-0012955 filed on Jan. 31, 2023 in the Republic of Korea, which is hereby incorporated by reference in its entirety.

BACKGROUND

Technical Field

The present disclosure relates to a display device.

Discussion of the Related Art

As society advances toward an information-oriented society, the field of display devices has rapidly advanced. Various display devices having excellent performance in terms of thinness, weight reduction, and low power consumption are being developed correspondingly. Examples of such a display device may include a liquid crystal display device (LCD) and an organic light emitting display device (OLED).

The display device may include a display panel on which pixels for displaying an image are disposed, a data driver for supplying data signals to data lines disposed on the display panel, a gate driver for sequentially supplying gate signals to gate lines disposed on the display panel, and a driving circuit such as a timing controller for controlling the data driver and the gate driver. Also, the display device may include touch electrodes for detecting a user's input (e.g., touch or the like), and may detect a touched point by sensing a change in capacitance formed on the touch electrodes.

In an electronic device such as the display device, a defect in performance of the display device may be caused due to electromagnetic interference (EMI) or the like.

SUMMARY

An aspect of the present disclosure is to provide a display device capable of reducing a level of electromagnetic interference (EMI).

Objects of the present disclosure are not limited to the above-mentioned objects, and other objects, which are not mentioned above, can be clearly understood by those skilled in the art from the following descriptions.

In one embodiment, a display device comprises: a display panel including a plurality of pixels and at least one common electrode overlapping at least a portion of the plurality of pixels in an active area of the display panel; a gate driver configured to supply a gate signal to the plurality of pixels; a source driving integrated circuit configured to supply a data signal to the plurality of pixels and configured to supply a common voltage to the common electrode; and a noise compensator circuit configured to receive a plurality of sensing signals from a plurality of sensing lines that are connected to at least one of the display panel, the gate driver, or the source driving integrated circuit, generate a plurality of inverted sensing signals by applying different gain values to signals obtained by inverting phases of each of the plurality of sensing signals, and generate a noise compensation signal based on at least one of the plurality of inverted sensing signals.

In one embodiment, a display device comprises: a display panel including a plurality of pixels and a common electrode overlapping the plurality of pixels; a gate driver configured to supply a gate signal to the plurality of pixels; a source driving integrated circuit configured to supply a data signal to the plurality of pixels and configured to supply a common voltage to the common electrode; a plurality of sensing lines, each sensing line connected to a different part of the display device; and a noise compensator circuit configured to receive a plurality of sensing signals indicative of noise at different parts of the display device from the plurality of sensing lines and generate a noise compensation signal based on the plurality of sensing signals, wherein the common voltage supplied to the common electrode is adjusted based on the noise compensation signal.

In one embodiment, a display device comprises: a display panel including a plurality of pixels and a common electrode overlapping the plurality of pixels; a gate driver configured to supply a gate signal to the plurality of pixels; a source driving integrated circuit configured to supply a data signal to the plurality of pixels and configured to supply a common voltage to the common electrode; a plurality of sensing lines connected to different parts of the display device; and a noise compensator circuit configured to receive a plurality of sensing signals that have different amplitudes from the plurality of sensing lines and normalize the plurality of sensing signals to have a same amplitude, and generate a noise compensation signal based on at least one the normalized plurality of sensing signals, wherein the common voltage supplied to the common electrode is adjusted based on the noise compensation signal.

Other detailed matters of the exemplary embodiments are included in the detailed description and the drawings.

The display device according to exemplary embodiments of the present disclosure can sense noises generated from each of causes of noise generation (e.g., the pixels, the gate driver, and/or the multiplexer) by using the plurality of sensing lines and can generate noise compensation signals for canceling the noises by applying different gain values thereto. Accordingly, the level of electromagnetic interference can be more effectively reduced.

The effects according to the present disclosure are not limited to the contents exemplified above, and more various effects are included in the present specification.

DETAILED DESCRIPTION

Figure 1:
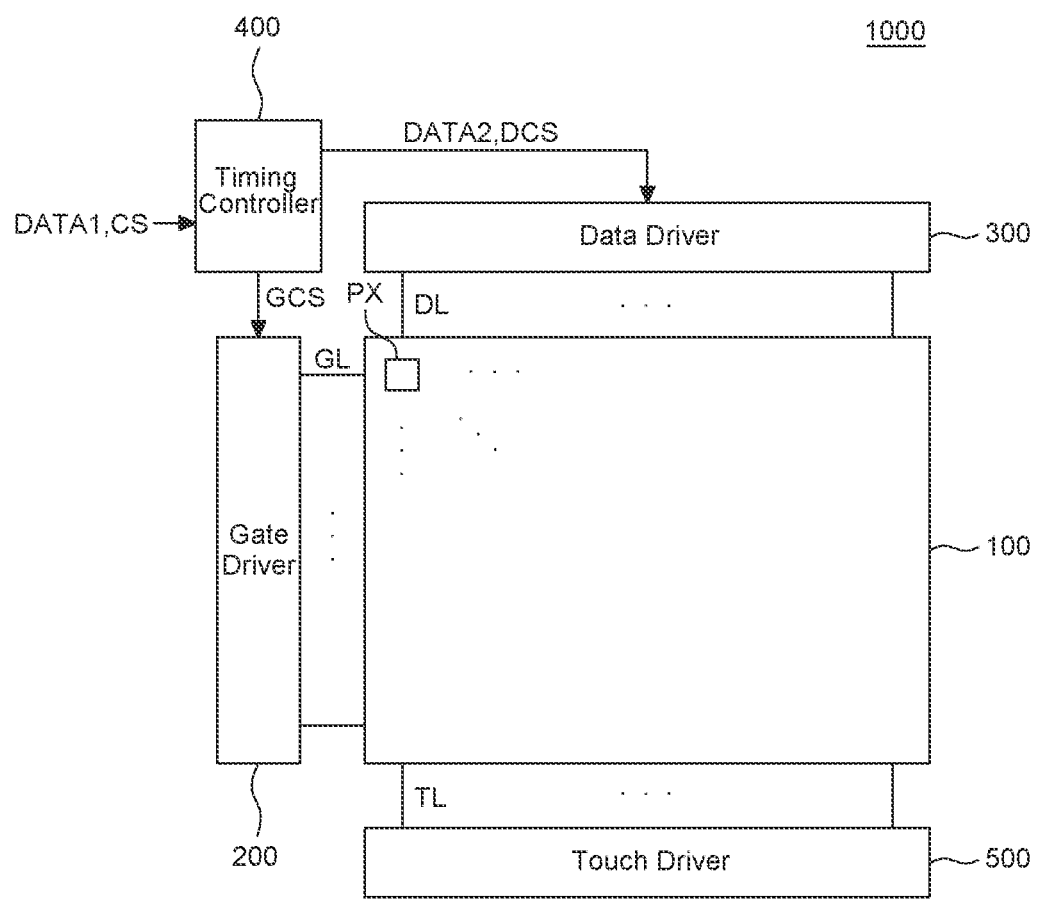
FIG. 1 is a block diagram illustrating a display device according to exemplary embodiments of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, various embodiments of the present disclosure will be described in detail with reference to the accompanying drawings.

FIG. 1 is a block diagram illustrating a display device according to exemplary embodiments of the present disclosure.

Referring to FIG. 1, a display device 1000 according to exemplary embodiments of the present disclosure may include a display panel 100, a gate driver 200, a data driver 300, a timing controller 400, and a touch driver 500.

The display panel 100 (or a display unit or pixel unit) may include an active area displaying an image and a non-active area excluding the active area. The image is not displayed in the non-active area.

Pixels PX for displaying an image may be disposed on the active area of the display panel 100. Also, a plurality of gate lines GL and a plurality of data lines DL may be disposed on the active area of the display panel 100. The gate lines GL may be disposed in one direction (e.g., a first direction DR1, see FIG. 4A), and the data lines DL may be disposed in a direction different from the one direction (e.g., a second direction DR2, see FIG. 4A).

Each of the pixels PX may be connected to a corresponding gate line among the gate lines GL and a corresponding data line among the data lines DL. Accordingly, a gate signal and a data signal may be applied to each of the pixels PX through the gate line and the data line. Further, each of the pixels PX can implement a gray level by the applied gate signal and data signal, and finally, an image may be displayed on the active area of the display panel 100 by the gray level displayed by each of the pixels PX.

On the non-active area of the display panel 100, various signal lines through which signals for controlling operations of the pixels PX disposed in the active area are transmitted, power lines, and the gate driver 200 may be disposed.

In an exemplary embodiment, the display panel 100 may include a sensing area for sensing a user's touch or the like and a non-sensing area excluding the sensing area. That is, the display panel 100 may also serve as a touch panel. In other words, the touch panel may be implemented to be embedded in a pixel array area of the display panel 100 in an in-cell touch method (e.g., an advanced in-cell touch (AIT) method). In the in-cell touch method, the display device 1000 (e.g., the touch driver 500) may sense a user's touch and the like by using electrodes formed in a shape of blocks (or points) inside the display panel 100 as touch electrodes.

A plurality of touch electrodes may be disposed on the sensing area of the display panel 100 to sense a user's touch and the like. Depending on embodiments, the sensing area may correspond to the active area. For example, the sensing area may have substantially the same area as the active area and may be disposed in the same location as the active area. In this case, the non-sensing area may correspond to the non-active area. However, this is simply exemplary, and the sensing area and the active area may have different areas or may be disposed in different positions.

The timing controller 400 (or a timing control circuit) may receive an input image signal DATA1 and an input control signal CS from the outside (e.g., a host system).

The timing controller 400 may generate image data DATA2 corresponding to operating conditions of the pixels PX based on the input image signal DATA1 and provide the generated image data DATA2 to the data driver 300.

The timing controller 400 may generate control signals for controlling the gate driver 200 and the data driver 300 based on the input control signal CS. For example, the input control signal CS may include timing signals such as a clock signal, a horizontal synchronization signal, a vertical synchronization signal, and a data enable signal. Here, the horizontal synchronization signal is a signal indicating the time taken to display one horizontal line on a screen, the vertical synchronization signal is a signal indicating the time taken to display one frame of the screen, and the data enable signal may correspond to a signal indicating a period of supplying a data signal to the pixels PX.

The timing controller 400 may generate a gate control signal GCS for controlling an operation timing of the gate driver 200 using timing signals included in the input control signal CS, and provide the generated gate control signal GCS to the gate driver 200.

In addition, the timing controller 400 may generate a data control signal DCS for controlling an operation timing of the data driver 300 using the timing signals included in the input control signal CS, and provide the generated data control signal DCS to the data driver 300.

The gate driver 200 (or a gate driving circuit, a scan driver, or a scan driver circuit) may receive the gate control signal GCS from the timing controller 400, and in response to the gate control signal GCS, sequentially provide gate signals to the gate lines GL. To this end, each gate driver 200 may include a shift register, a level shifter, and the like. The gate control signal GCS may include a gate start signal for generating the gate signal, and a plurality of clock signals.

The data driver 300 (or a data driving circuit) may receive the data control signal DCS from the timing controller 400, and convert the image data DATA2 into an analog data signal (e.g., a data voltage) in response to the data control signal DCS. The data driver 300 may output data signals to the data lines DL and supply them to the pixels PX.

The touch driver 500 may detect whether a user's touch is present and a touch location through a plurality of touch lines TL connected to the plurality of touch electrodes disposed on the display panel 100. For example, when a user touches a portion of the sensing area of the display panel 100, the touch driver 500 may sense touch signals of the touch electrodes disposed on the display panel 100 through the touch lines TL and detect whether a user's touch is present and a touch location.

More specifically, the touch driver 500 may supply touch driving signals to the touch electrodes disposed on the display panel 100 and receive touch sensing signals from the touch electrodes. The touch driver 500 may detect whether a user's touch is present and a touch location using the applied touch sensing signal. For example, the touch driver 500 may determine whether a user's touch is present and a touch location through a mutual-capacitance method using a change in mutual capacitance of the touch electrodes or a self-capacitance method using a change in self-capacitance of the touch electrodes.

Meanwhile, in FIG. 1, the data driver 300 and the touch driver 500 are illustrated as being separate components, but this is for convenience of explanation, and embodiments of the present disclosure are not limited thereto. For example, the data driver 300 and the touch driver 500 may be configured as one integrated circuit (e.g., a source driving integrated circuit SIC of FIG. 4A).

Meanwhile, examples of the display device 1000 according to exemplary embodiments of the present disclosure may include various types of display devices such as a liquid crystal display device, an organic light emitting display device, a plasma display device, a quantum dot display device, and the like.

For example, when the display device 1000 according to exemplary embodiments of the present disclosure is a liquid crystal display device, the display panel 100 may include a liquid crystal layer formed between two substrates (e.g., an upper substrate and a lower substrate), and may be operated in any known mode, such as a twisted nematic (TN) mode, a vertical alignment (VA) mode, an in plane switching (IPS) mode, or a fringe field switching (FFS) mode.

A black matrix, a color filter, and the like may be formed on an upper substrate of the display panel 100, and thin film transistors, the pixels PX, and the like may be formed on the lower substrate of the display panel 100. The display panel 100 may be implemented with a color filter on TFT (COT) structure, and in this case, the black matrix and the color filter may be formed on the lower substrate of the display panel 100.

Also, common electrodes to which a common voltage is supplied may be formed on the upper substrate or lower substrate of the display panel 100. Polarizers may be attached to the upper substrate and the lower substrate of the display panel 100, and an alignment layer for setting a tilt angle of liquid crystals may be formed on an inner surface thereof in contact with the liquid crystals.

A column spacer may be formed between the upper substrate and the lower substrate of the display panel 100 to maintain a cell gap of liquid crystal cells. In the case of the liquid crystal display device, a backlight unit is disposed below a rear surface of a lower polarizer of the display panel 100, and the backlight unit may be implemented as an edge type or a direct type.

Here, in the liquid crystal display device, the plurality of touch electrodes that are disposed on the display panel 100 to sense a user's touch may be common electrodes to which a common voltage for display driving is applied.

In an exemplary embodiment, the common voltage applied to the common electrodes (touch electrodes) may be supplied from the touch driver 500 through the touch lines TL.

As another example, when the display device 1000 according to exemplary embodiments of the present disclosure is an organic light emitting display device, it may include a first electrode (an anode electrode), an organic light emitting layer, and a second electrode (a cathode electrode) constituting an organic light emitting diode (OLED), an encapsulation layer having a sealing function, and a touch sensor metal layer.

Here, in the organic light emitting display device, the plurality of touch electrodes that are disposed on the display panel 100 to sense a user's touch or the like may be formed on the touch sensor metal layer, and may be formed on a second electrode layer constituting the cathode electrode of the organic light emitting diode.

Meanwhile, the common voltage applied to the common electrodes or the touch electrodes may be set to a direct current (DC) voltage that is applied at a specific voltage level for a certain period of time when a level of a data signal supplied to the display panel 100 is changed within a driving period of the display device 1000. Also, the common voltage applied to the common electrodes or the touch electrodes may be referred to as a display voltage or another name depending on a type of a display device such as a liquid crystal display device or an organic light emitting display device.

Meanwhile, as noise may occur within the display device 1000, electromagnetic waves may be generated by the pixels PX of the display panel 100, electromagnetic waves may be generated by the gate driver 200, and/or electromagnetic waves may be generated by the source driving integrated circuit described above (e.g., a multiplexer included in the source driven integrated circuit). As described above, due to the influence of noises that may occur within the display device 1000, that is, electromagnetic interference (EMI), system stability of the display device 1000 may be degraded. In this case, a touch sensing signal (a voltage) or the like that is obtained when the display device 1000 senses a touch input is affected, so that touch sensing performance of the display device 1000 may be degraded, or other signals (voltages) required for displaying an image of the display device 1000 may also be affected, so that display performance may be lowered.

Accordingly, the display device 1000 according to exemplary embodiments of the present disclosure may sense electromagnetic waves as noise that may occur within the display device 1000, and generate a noise compensation signal NCS (see FIG. 7) based on the sensing. For example, the display device 1000 may sense electromagnetic waves generated by the pixels PX of the display panel 100, electromagnetic waves generated by the gate driver 200, and/or electromagnetic waves generated by the source driving integrated circuit described above (e.g., a multiplexer included in the source driving integrated circuit). Also, the display device 1000 may generate the noise compensation signal NCS (see FIG. 7) based on the sensing and provide the noise compensation signal NCS (see FIG. 7) to a voltage generator VG (see FIG. 7) that generates a common voltage. Accordingly, a level of electromagnetic interference of the display device 1000 may be reduced.

To this end, in an exemplary embodiment, the display device 1000 may further include a noise compensator NCP (see FIG. 7), which will be described in more detail with reference to FIG. 7 hereinafter.

Figure 2:
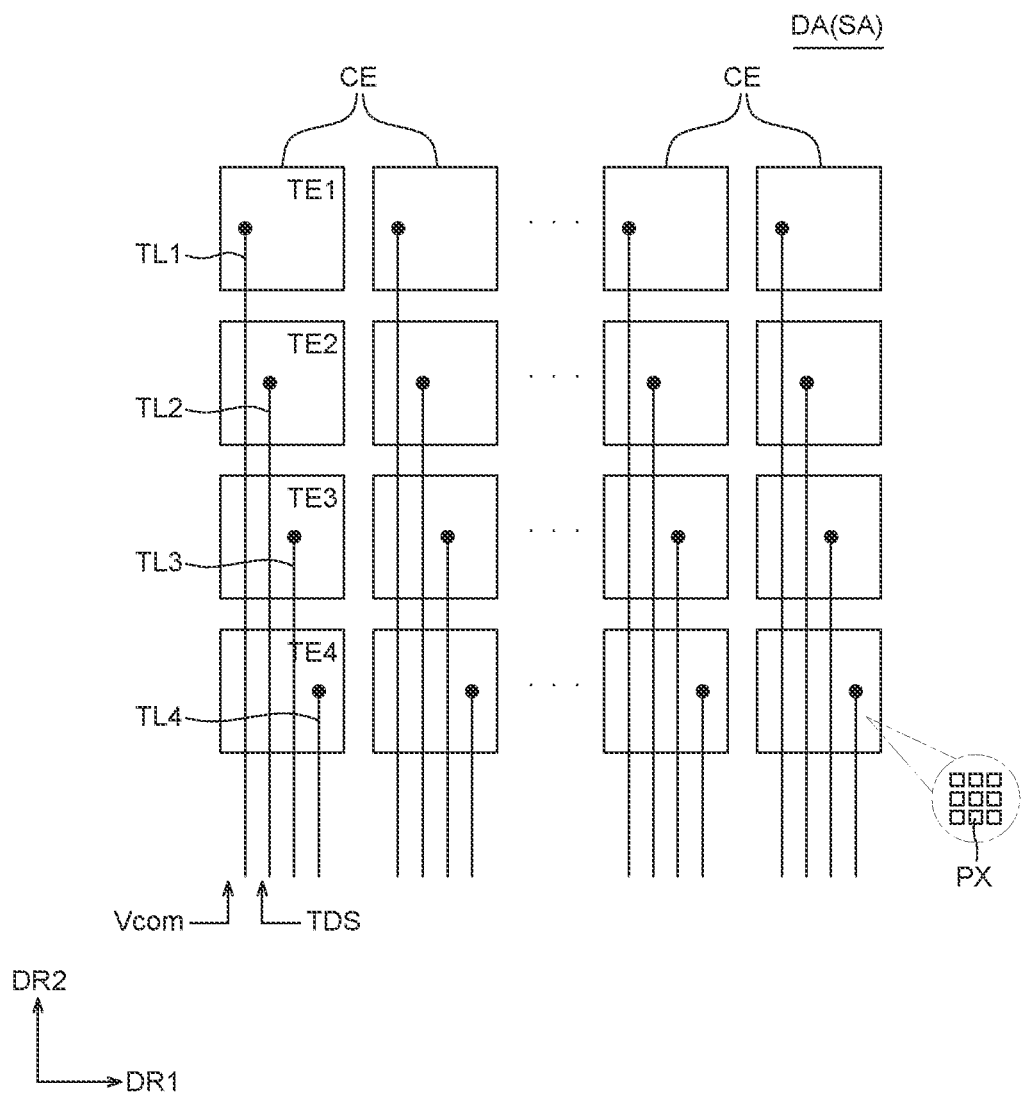
FIG. 2 is a diagram illustrating an example of a structure of a touch electrode disposed on a sensing area of the display device of FIG. 1 according to exemplary embodiments of the present disclosure.

FIG. 2 is a diagram illustrating an example of structures of touch electrodes disposed on the sensing area of the display device of FIG. 1.

Referring to FIGS. 1 and 2, as described above, in the display device 1000 according to exemplary embodiments of the present disclosure, the touch panel may be implemented to be embedded in the pixel array area of the display panel 100 in the in-cell touch method (e.g., the advanced in-cell touch (AIT) method). In the in-cell touch method, the touch driver 500 may sense a user's touch and the like using common electrodes CE configured in a shape of blocks or points inside the display panel 100 as touch electrodes TE1, TE2, TE3, and TE4.

For example, in the display panel 100 in the in-cell touch method, the common electrode CE corresponding to at least some pixels PX among a plurality of the pixels PX formed inside the display panel 100 forms one touch electrode among the touch electrodes TE1, TE2, TE3, and TE4. That is, the respective touch electrodes TE1, TE2, TE3, and TE4 may be defined by the common electrodes CE formed separately in the display panel 100. Here, each of the touch electrodes TE1, TE2, TE3, and TE4 corresponding to the common electrodes CE that are separately formed in the display panel 100 may form one common electrode segment. The one common electrode segment is connected to the plurality of pixels PX in common, so that a common voltage Vcom may be applied to the plurality of pixels PX that are connected.

The plurality of touch electrodes TE1, TE2, TE3, and TE4 may be disposed in lines (i.e., in the first direction DR1 and in the second direction DR2) on the sensing area (or the active area) of the display panel 100. To each of the touch electrodes TE1, TE2, TE3, and TE4, a touch driving signal TDS may be supplied and the touch lines TL for configured to receive the touch sensing signal may be connected.

Each of the touch electrodes TE1, TE2, TE3, and TE4 may be implemented as touch sensors that sense a touch input using a capacitance-based touch sensing method. In this case, each of the touch electrodes TE1, TE2, TE3, and TE4 may supply the common voltage Vcom to the pixels PX corresponding thereto during a display driving period and receive the touch driving signal TDS during a touch driving period.

Meanwhile, as described with reference to FIG. 1, when the display device 1000 according to exemplary embodiments of the present disclosure is the organic light emitting display device, the touch electrodes TE1, TE2, TE3, and TE4 defined by the common electrodes CE that are separately formed in the display panel 100 may be configured as cathode electrodes of the organic light emitting diodes (in other words, the common electrode CE of FIG. 2 may constitute at least a portion of the cathode electrode of the organic light emitting diode).

Figure 3:
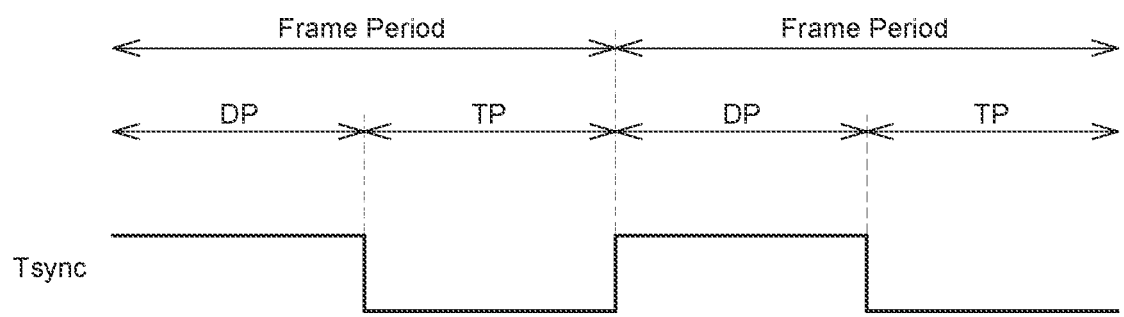
FIG. 3 is a timing diagram for explaining an example of a display driving period and a touch driving period of the display device of FIG. 1 according to exemplary embodiments of the present disclosure.

FIG. 3 is a timing diagram for explaining an example of the display driving period and the touch driving period of the display device of FIG. 1 according to one embodiment.

Referring to FIGS. 1 to 3, the display device 1000 according to exemplary embodiments of the present disclosure may perform display driving for displaying an image during a display driving period DP defined within one frame period, and may perform touch driving for sensing a touch input by a user during a touch driving period TP defined within one frame period.

To this end, the display device 1000 may also use the common electrodes CE for driving the pixels PX as electrodes for touch sensing. Accordingly, the common voltage Vcom may be supplied to the thin film transistors connected to the common electrodes CE during the display driving period DP, and the touch driving signal TDS may be supplied to the common electrodes CE operating as the touch electrodes TE1, TE2, TE3, and TE4 during the touch driving period TP.

The display driving period DP and the touch driving period TP may be temporally identical or overlapping periods, or may be temporally separated periods.

Meanwhile, a case in which the display driving period DP and the touch driving period TP are temporally separated may be referred to as time division driving. On the other hand, in a case in which display driving period DP and the touch driving period TP are temporally identical, display driving and touch driving may be performed simultaneously, and this driving method may be referred to as time free driving.

In the case of time division driving, the display driving period DP and the touch driving period TP may be alternated.

In this manner, in a case in which the display driving period DP and the touch driving period TP alternate and separate temporally, the touch driving period TP may correspond to a blank period in which display driving is not performed.

Meanwhile, the display device 1000 may generate a touch synchronization signal Tsync that swings between a high level and a low level, to thereby identify or control the display driving period DP and the touch driving period TP. That is, the touch synchronization signal Tsync may be a timing control signal defining the touch driving period TP.

For example, a high level period (or a low level period) of the touch synchronization signal Tsync may correspond to the display driving period DP, and a low level period (or the high level period) of the touch synchronization signal Tsync may correspond to the touch driving period TP.

In this case, the touch driver 500 may apply the touch driving signal TDS to the touch electrodes TE1, TE2, TE3, and TE4 during the touch driving period TP based on the touch synchronization signal Tsync, and detect whether a touch is present and a touch location using the touch sensing signals received from TE1, TE2, TE3, and TE4.

Meanwhile, in relation to a method of allocating the display driving period DP and the touch driving period TP within one display frame period, one display frame period is divided into one display driving period DP and one touch driving period TP, display driving is performed during the one display driving period DP, and touch driving for sensing a user's touch input may be performed during the one touch driving period TP corresponding to the blank period.

That is, the display device 1000 may be driven for touch once during the display frame period, which is one cycle of a frame frequency or screen refresh rate of the display panel 100.

For example, when the frame frequency is 60 Hz, the touch driving period TP for touch sensing may be performed for a predetermined interval after display driving is performed within a period in time of 1/60 second (sec). In this case, a touch report rate may correspond to 60 Hz.

As another example, one display frame period is divided into two or more display driving periods DP and two or more touch driving periods TP, and display driving may be performed during the two or more display driving periods DP and touch driving for sensing a user's touch input once or twice or more may be performed in an overall area or a partial area of a screen during the two or more touch driving periods TP within the one display frame period.

Figure 4A:
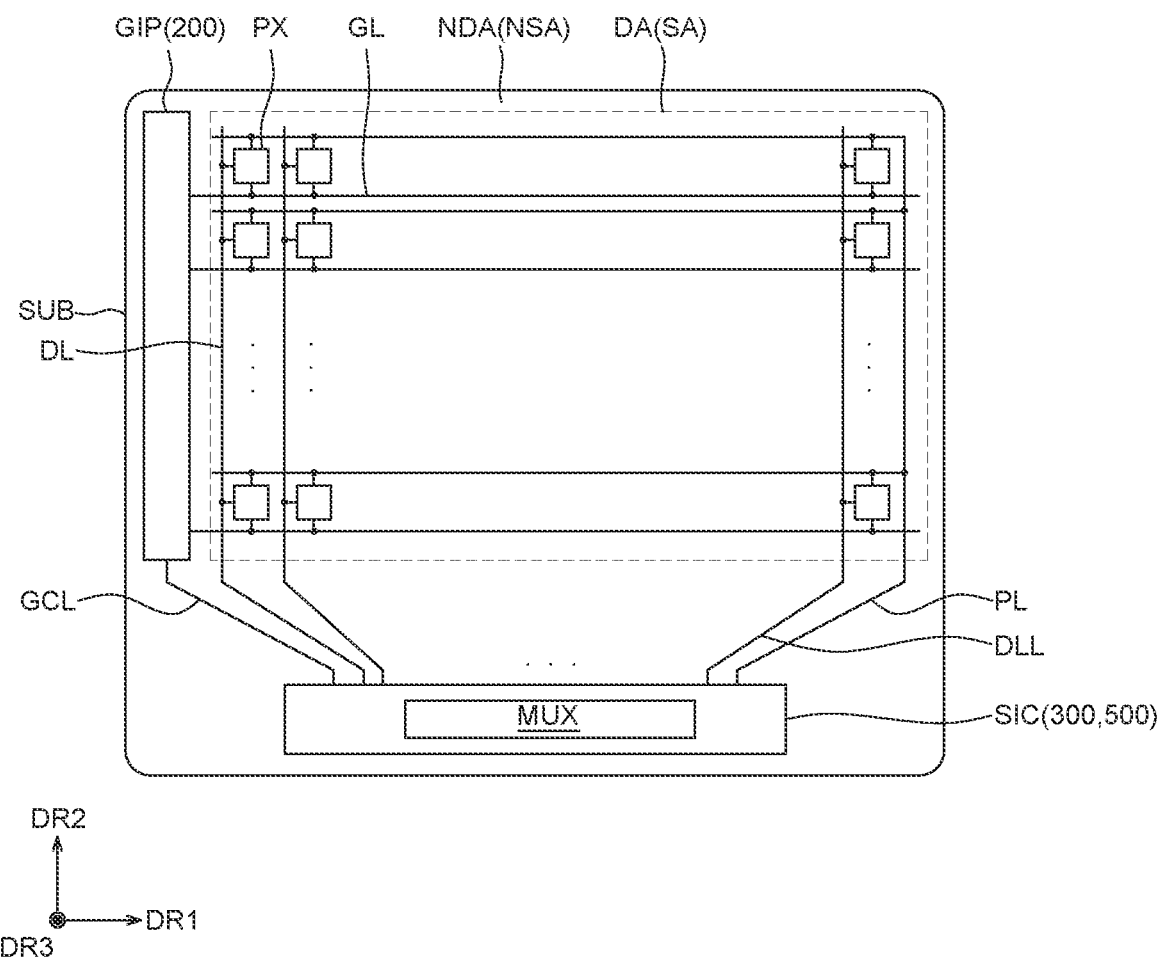
FIG. 4A is a plan view illustrating an example of a display panel included in the display device of FIG. 1 according to exemplary embodiments of the present disclosure.

FIG. 4A is a plan view illustrating an example of a display panel included in the display device of FIG. 1 according to one embodiment.

Figure 4B:
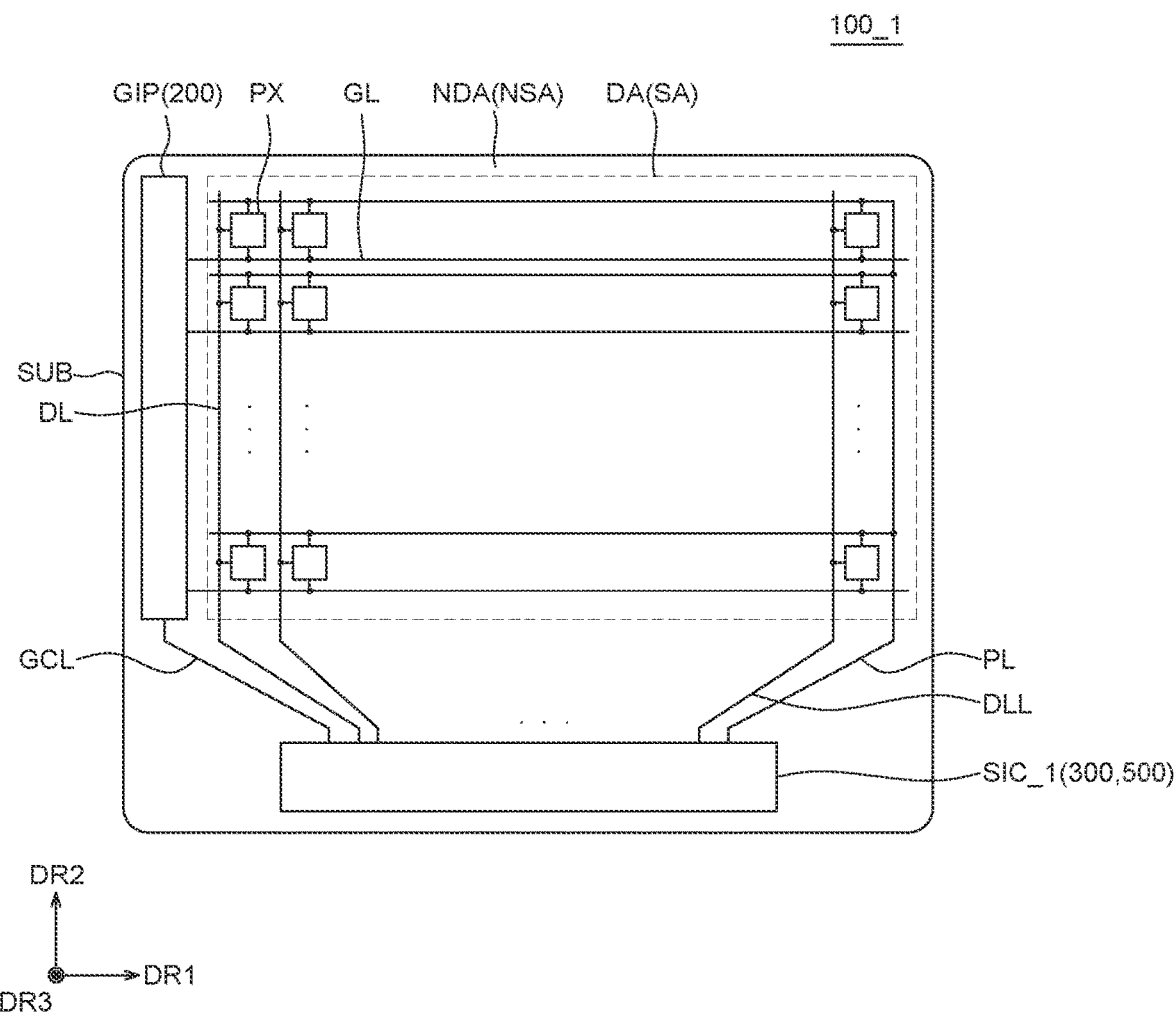
FIG. 4B is a plan view illustrating an example of a display panel included in the display device of FIG. 1 according to exemplary embodiments of the present disclosure.

FIG. 4B is a plan view illustrating an example of a display panel included in the display device of FIG. 1 according to one embodiment.

Figure 5:
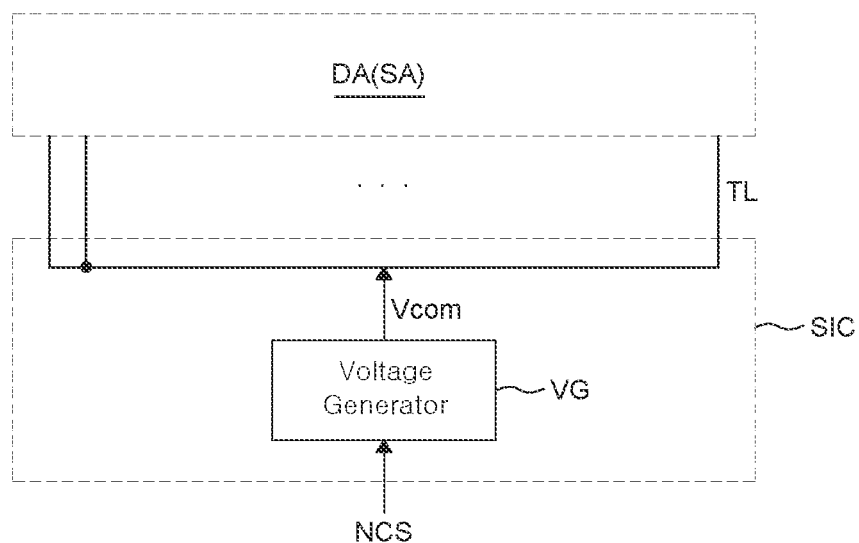
FIG. 5 is a block diagram illustrating an example of a source driving integrated circuit included in the display device of FIG. 1 according to exemplary embodiments of the present disclosure.

FIG. 5 is a block diagram illustrating an example of a source driving integrated circuit included in the display device of FIG. 1 according to one embodiment.

Referring to FIGS. 1, 2, 3, and 4A, the display panel 100 may include a substrate SUB (e.g., a lower substrate), the plurality of pixels PXs, the gate lines GL, the data lines DL, a power line PL, a gate control line GCL, a gate driver GIP, the source driving integrated circuit SIC, and data connection lines DLL.

As described with reference to FIG. 1, the display panel 100 may include an active area DA displaying an image and a non-active area NDA. Meanwhile, according to exemplary embodiments, the active area DA may correspond to a sensing area SA for sensing a user's touch input, and the non-active area NDA may correspond to a non-sensing area NSA. However, embodiments of the present disclosure are not limited thereto, and for example, a part of the non-active area NDA may correspond to the sensing area SA.

The active area DA (or the sensing area SA) may be parallel to a surface defined by a first direction axis (e.g., an axis extending in the first direction DR1) and a second direction axis (e.g., an axis extending in the second direction DR2). A normal direction of the display surface, that is, a thickness direction of the display panel 100 may be defined as a third direction DR3.

A front surface (or an upper surface) and a rear surface (or a lower surface) of each member or unit of the display device 1000 (or the display panel 100) described below may be distinguished in the third direction DR3. However, the first to third directions DR1, DR2, and DR3 illustrated in the present disclosure are merely exemplary, and the first to third directions DR1, DR2, and DR3 are relative concepts and can be changed to other directions. Hereinafter, for convenience of explanation, the first to third directions DR1, DR2, and DR3 will be referred with the same reference numerals.

Meanwhile, when "overlap" is described in the present disclosure, unless otherwise defined, it means that two components overlap in the thickness direction (i.e., the third direction DR3) of the display device 1000 (or the display panel 100).

Meanwhile, in FIGS. 4A and 4B, the display panel 100 is illustrated as having a rounded shape at a corner portion where one long side and one short side intersect, but this is merely exemplary, and a shape of the display panel 100 is not limited thereto. For example, the display panel 100 may have an angular shape at a corner portion where one long side and one short side intersect.

In an exemplary embodiment, the display panel 100 may include the active area DA having a planar shape, but the present disclosure is not limited thereto. For example, the display panel 100 may include a curved active area or a three-dimensional active area.

The plurality of pixels PX may be disposed on the active area DA. Each of the pixels PX may be connected to a corresponding gate line among the gate lines GL, a corresponding data line among the data lines DL, and the power line PL. According to an exemplary embodiment, each of the pixels PX may include a driving transistor, at least one switching transistor, a light emitting element, and a storage capacitor.

The display panel 100 may include the gate lines GL, the data lines DL, and the power line PL.

In an exemplary embodiment, the gate lines GL may extend in the first direction DR1, and the data lines DL may extend in the second direction DR2. The power line PL may include at least one line extending in the first direction DR1 and a plurality of lines branched from the at least one line in the first direction DR1.

In an exemplary embodiment, the source driving integrated circuit SIC, the gate driver GIP, the gate control line GCL, and the data connection lines DLL may be further disposed on the display panel 100. The source driving integrated circuit SIC, the gate driver GIP, the gate control line GCL, and the data connection lines DLL may be disposed on the non-active area NDA (or the non-sensing area NSA).

Meanwhile, although the gate driver GIP is illustrated as being disposed on the non-active area NDA corresponding to one side of the active area DA in FIG. 4A, this is simply exemplary and embodiments of the present disclosure are not limited thereto. For example, two gate drivers GIP may be disposed on the non-active area NDA corresponding to both sides of the active area DA.

Meanwhile, the gate driver GIP may be substantially the same as or similar to the gate driver 200 described with reference to FIG. 1.

The source driving integrated circuit SIC may supply data signals to the data lines DL through the data connection lines DLL. Also, the source driving integrated circuit SIC may generate a gate control signal for controlling the gate driver GIP through the gate control line GCL and supply the gate control signal to the gate driver GIP.

In an exemplary embodiment, the source driving integrated circuit SIC is configured as an integrated circuit (IC) and may be attached onto the substrate SUB by a chip on glass (COG) method, a chip on plastic (COP) method, an ultrasonic bonding method or the like.

Meanwhile, as described with reference to FIG. 1, the source driving integrated circuit SIC may be configured to include the data driver 300 and the touch driver 500 described with reference to FIG. 1 as one integrated circuit. That is, the source driving integrated circuit SIC may not only supply data signals to the data lines DL through the data connection lines DLL, but also supply the common voltage Vcom (or the touch driving signal TDS) to the common electrodes CE (or the touch electrodes TE1, TE2, TE3 and TE4).

In an exemplary embodiment, the source driving integrated circuit SIC may include a multiplexer MUX. For example, the touch driver 500 included in the source driving integrated circuit SIC may selectively detect a touch sensing signal having a difference in sensing value depending on whether a touch is present on the sensing area SA, using the multiplexer MUX. In this case, power consumption in touch sensing may be reduced.

Meanwhile, this is merely exemplary, and embodiments of the present disclosure are not limited thereto. For example, further referring to FIG. 4B, a source driving integrated circuit SIC_1 included in a display panel 100_1 may not include a multiplexer, as illustrated in FIG. 4B.

In an exemplary embodiment, as described with reference to FIGS. 1 to 3, the source driving integrated circuit SIC (e.g., the touch driver 500) may supply the common voltage Vcom to the common electrodes CE disposed in the active area DA (or the sensing area SA) through the touch lines TL.

For example, referring to FIG. 5, the source driving integrated circuit SIC may further include the voltage generator VG (e.g., a circuit). The voltage generator VG may supply the common voltage Vcom to the common electrodes CE (or the touch electrodes TE1, TE2, TE3, and TE4) through the touch lines TL.

Meanwhile, as described with reference to FIG. 1, due to the influence of noises that may occur within the display device 1000, that is, electromagnetic interference (EMI), system stability of the display device 1000 may be degraded, and touch sensing performance and display performance of the display device 1000 may be degraded.

To this end, the display device 1000 (e.g., the noise compensator NCP, see FIG. 7) according to exemplary embodiments of the present disclosure may generate the noise compensation signal NCS (see FIG. 7) based on sensed noises (e.g., electromagnetic waves). For example, the noise compensation signal NCS (see FIG. 7) is a signal generated by adjusting inverse signals of the sensed noises to individual intensities, and may be provided to the voltage generator VG. Accordingly, the level of electromagnetic interference of the display device 1000 may be reduced.

Figure 6A:
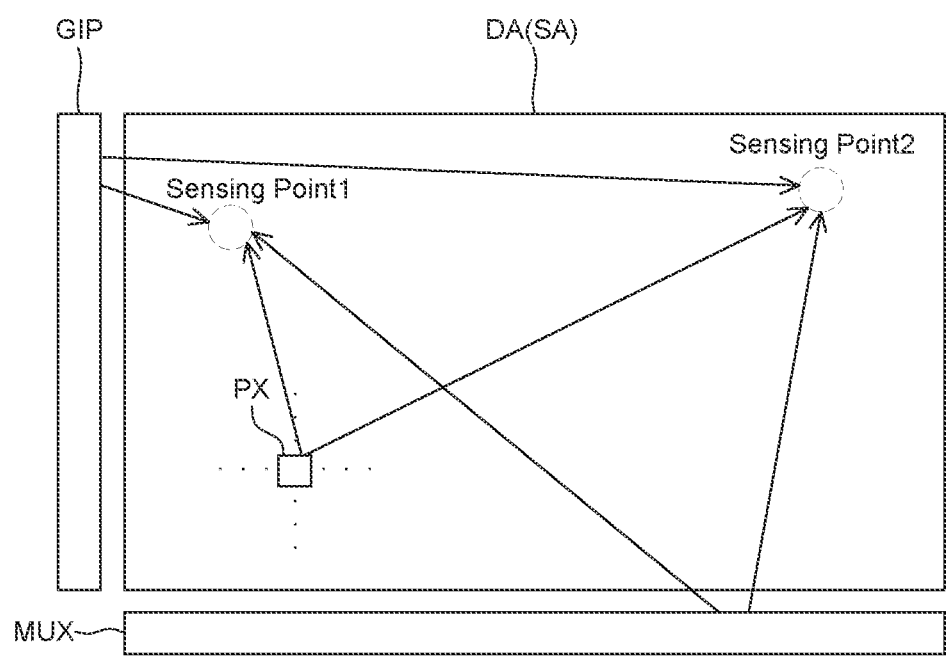
FIGS. 6A and 6B are diagrams for explaining electromagnetic interference (EMI) generated in the display device according to exemplary embodiments of the present disclosure.
Figure 6B:
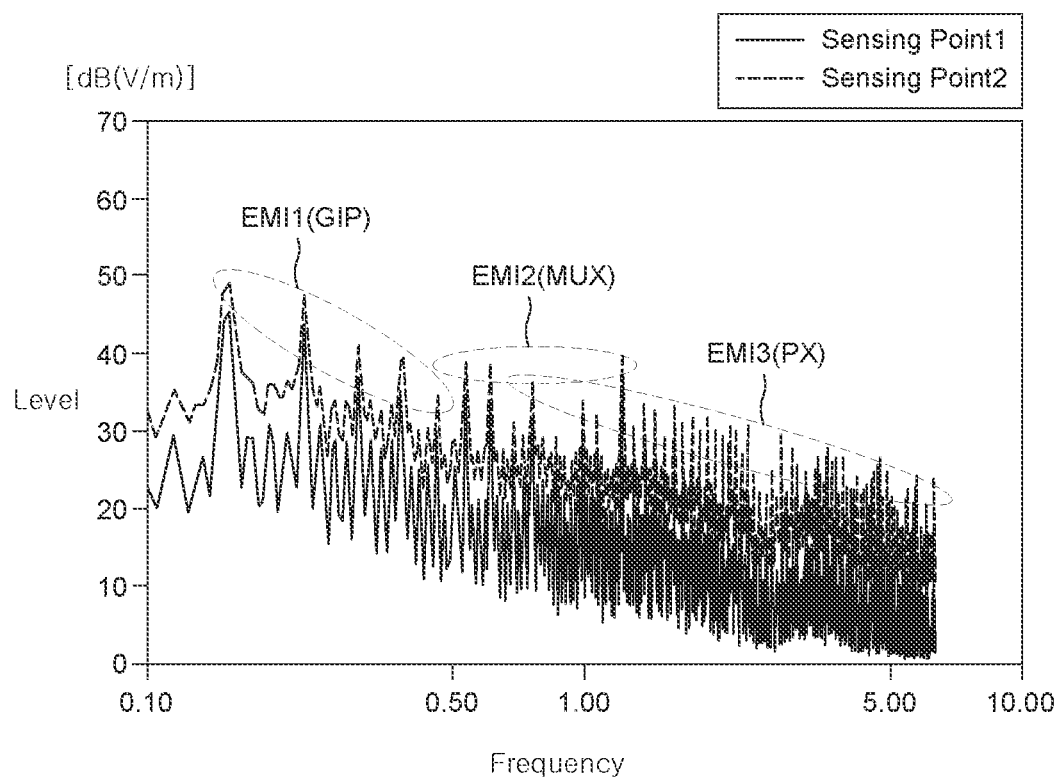

FIGS. 6A and 6B are diagrams for explaining electromagnetic interference (EMI) generated in the display device according to one embodiment.

Referring to FIGS. 6A and 6B, noises may be generated by various causes in the display device.

For example, referring to FIGS. 6A and 6B, as noise may occur in the display device, there may be electromagnetic waves (shown as "EMI3" in FIG. 6B) generated by the pixels PX disposed on the display panel, electromagnetic waves generated by the gate driver GIP (shown as "EMI1" in FIG. 6B) and/or electromagnetic waves generated by the multiplexer MUX included in the source driving integrated circuit (shown as "EMI2" in FIG. 6B).

Here, as illustrated in FIG. 6B, each of the noises is a pulse type, and according to causes of noise generation (e.g., the pixel PX, the gate driver GIP, or the multiplexer MUX), the noises may have different intensities that are transmitted to specific points (shown as "Sensing Point1" and "Sensing Point2" in FIGS. 6A and 6B) on the active area DA (or the sensing area SA). Accordingly, it is necessary to generate a compensation signal for canceling the noises by applying different gain values (Gains) to each of the noises.

Accordingly, the display device 1000 according to exemplary embodiments of the present disclosure may sense noises generated from each of the pixels PX, the gate driver GIP, and the multiplexer MUX according to each cause of noise generation, and generate the noise compensation signals NCS (see FIG. 7) for canceling the noises by applying different gain values to each of the noises. To explain this in more detail, FIGS. 7 to 22 will be referred to hereinafter.

Figure 7:
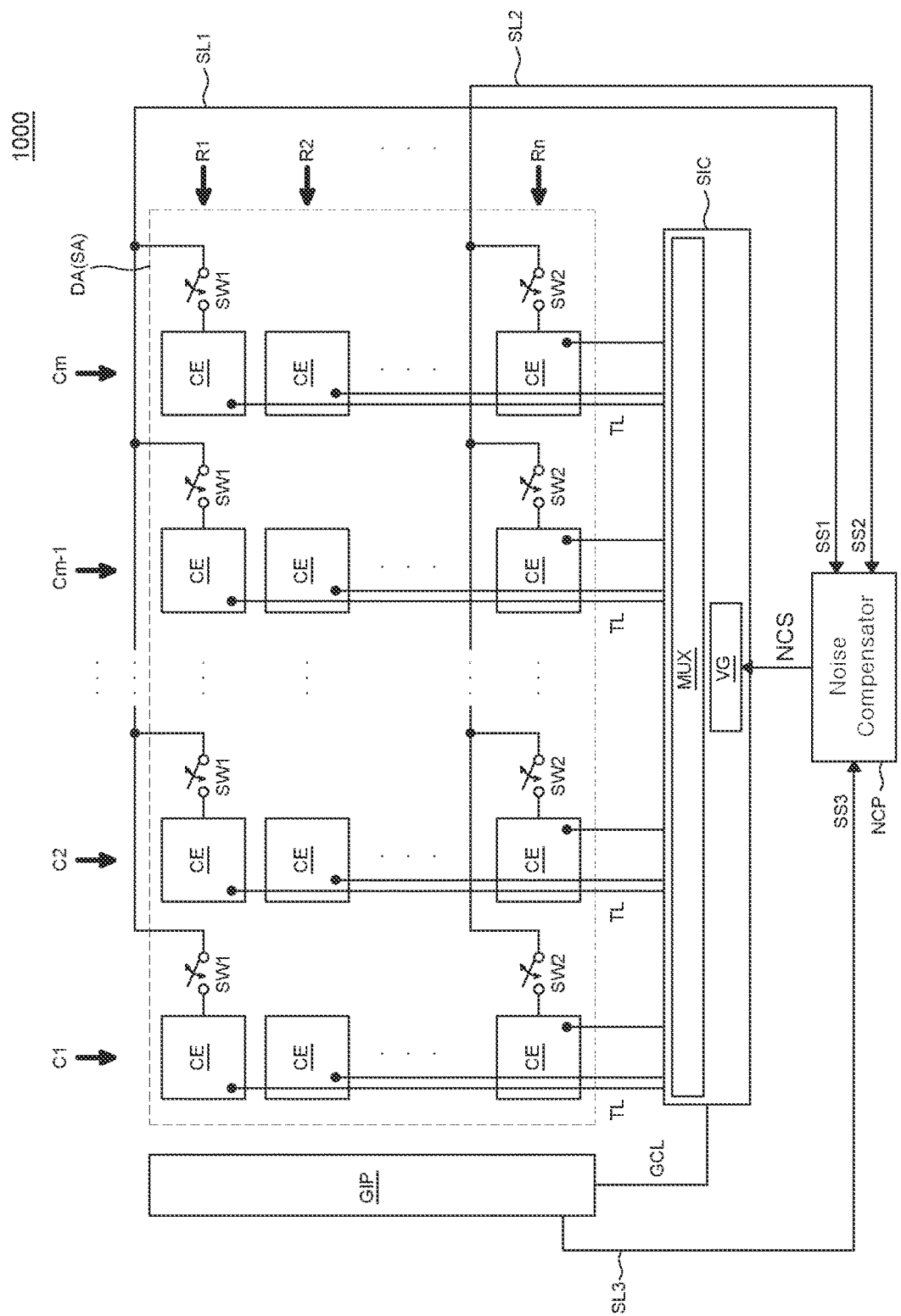
FIG. 7 is a diagram illustrating the display device according to exemplary embodiments of the present disclosure.

FIG. 7 is a diagram illustrating the display device according to exemplary embodiments of the present disclosure.

Figure 8:
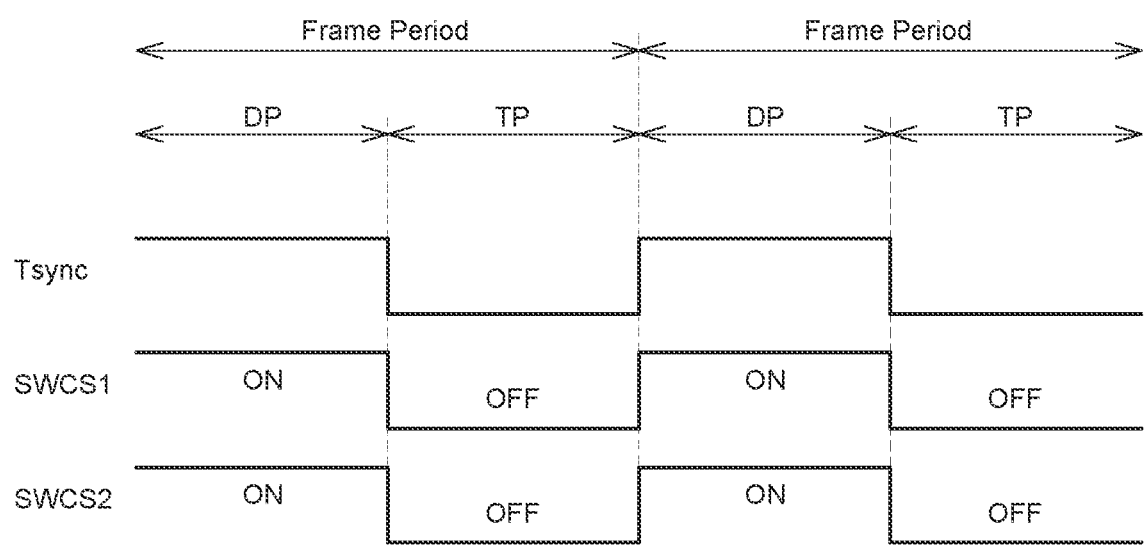
FIG. 8 is a timing diagram for explaining an example of signals supplied in a display driving period and a touch driving period of the display device of FIG. 7 according to exemplary embodiments of the present disclosure.

FIG. 8 is a timing diagram for explaining an example of signals supplied in a display driving period and a touch driving period of the display device of FIG. 7 according to one embodiment.

Figure 9:
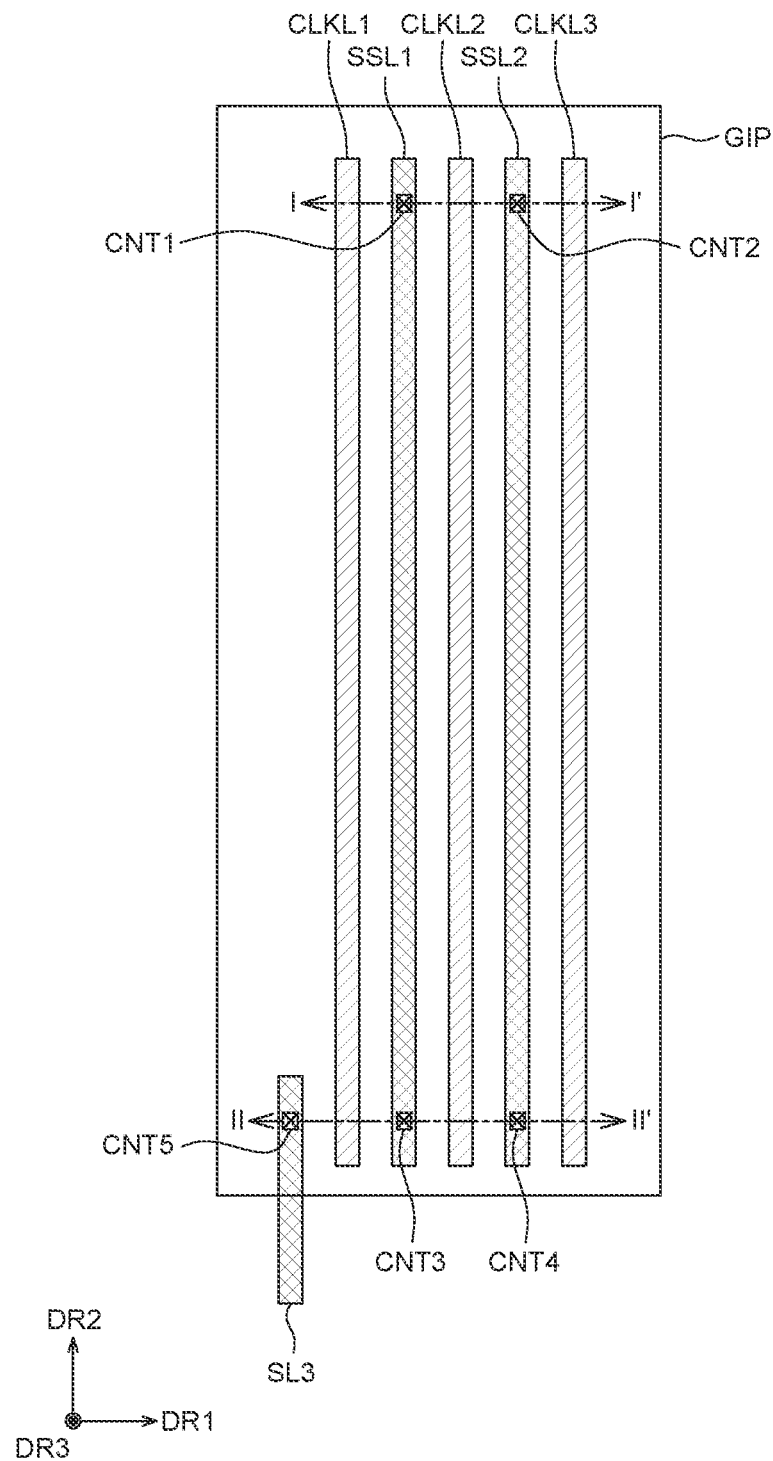
FIG. 9 is a diagram illustrating an example of a gate driver included in the display device of FIG. 7 according to exemplary embodiments of the present disclosure.

FIG. 9 is a diagram illustrating an example of a gate driver included in the display device of FIG. 7 according to one embodiment.

Figure 10:
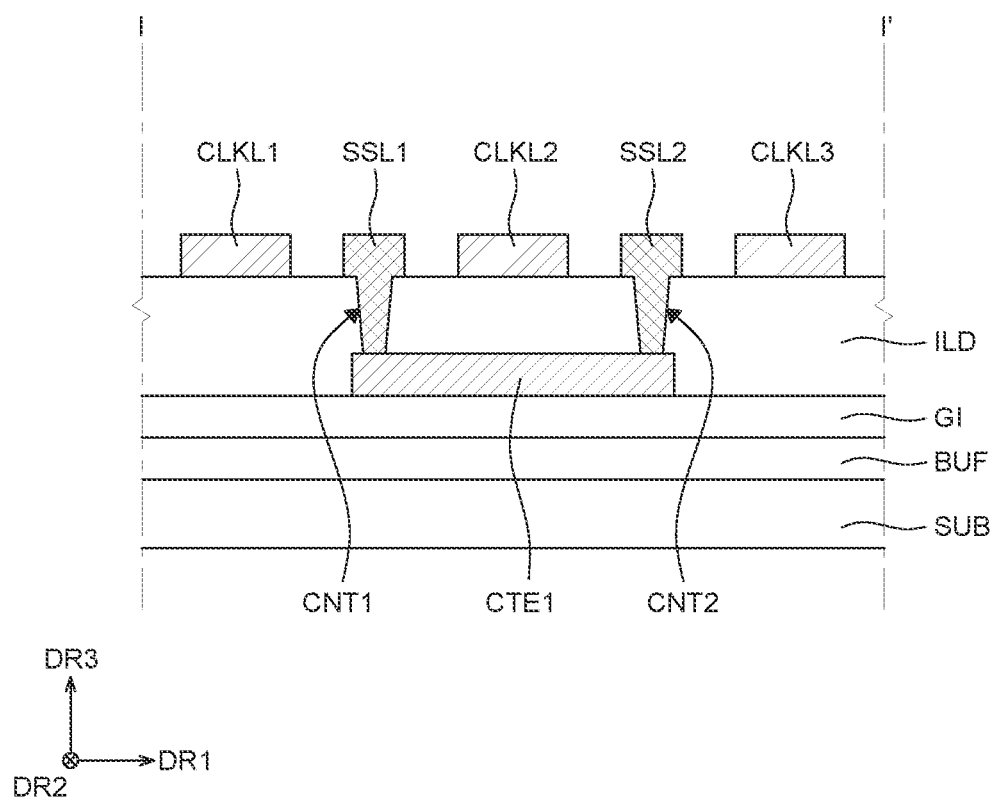
FIG. 10 is a cross-sectional view illustrating an example taken along line I-I' illustrated in FIG. 9 according to exemplary embodiments of the present disclosure.

FIG. 10 is a cross-sectional view illustrating an example taken along line I-I' illustrated in FIG. 9 according to one embodiment.

Figure 11:
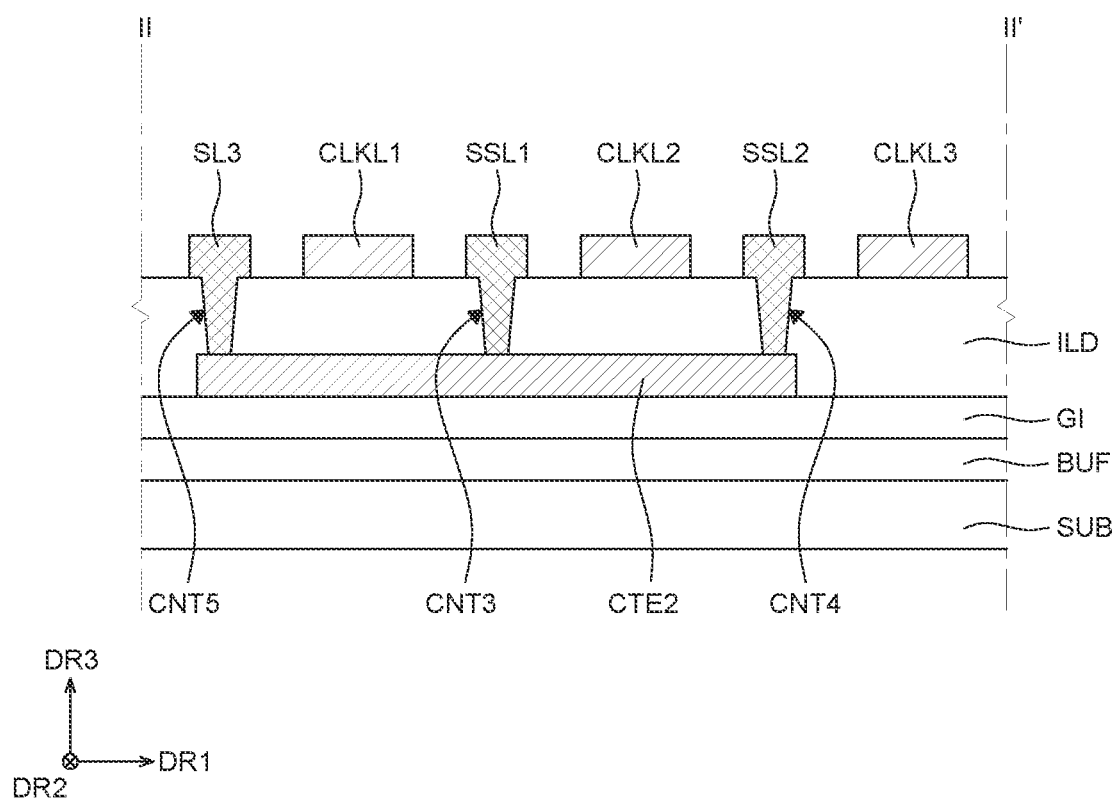
FIG. 11 is a cross-sectional view illustrating an example taken along line II-II' illustrated in FIG. 9 according to exemplary embodiments of the present disclosure.

FIG. 11 is a cross-sectional view illustrating an example taken along line II-II' illustrated in FIG. 9 according to one embodiment.

Figure 12:
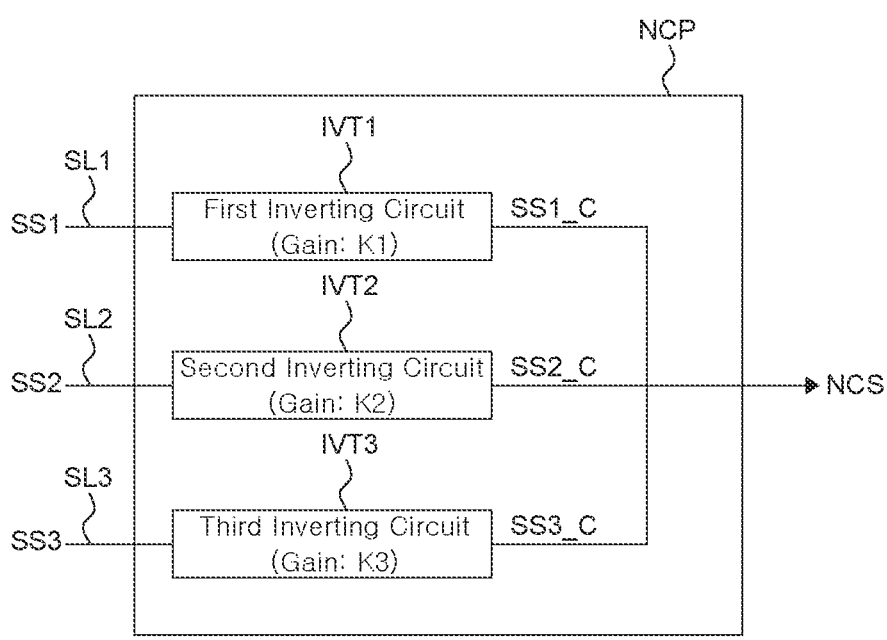
FIG. 12 is a block diagram illustrating an example of a noise compensator included in the display device of FIG. 7 according to exemplary embodiments of the present disclosure.

FIG. 12 is a block diagram illustrating an example of a noise compensator included in the display device of FIG. 7 according to one embodiment.

Figure 13:
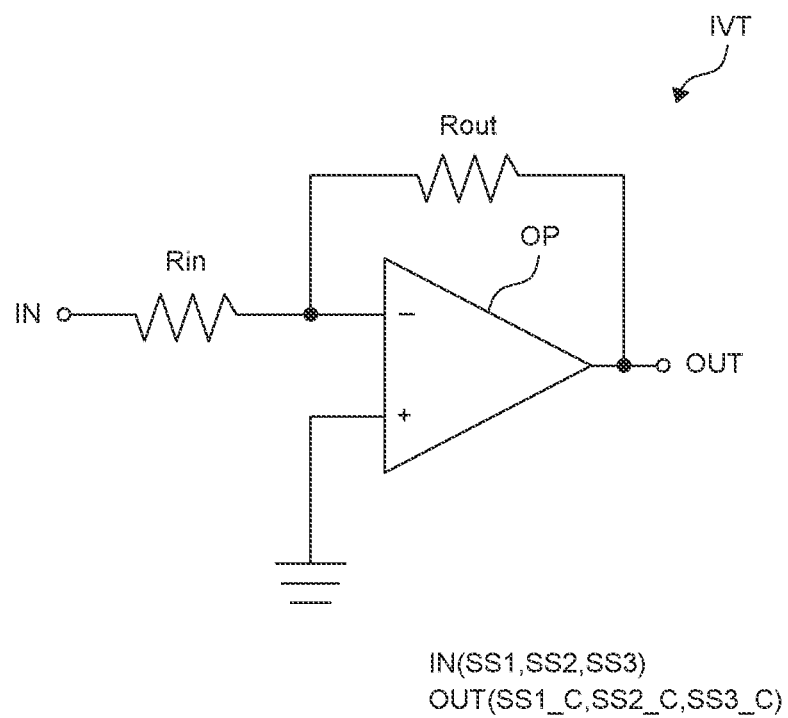
FIG. 13 is a circuit diagram illustrating an example of an inverting circuit included in the noise compensator of FIG. 12 according to exemplary embodiments of the present disclosure.

FIG. 13 is a circuit diagram illustrating an example of an inverting circuit included in the noise compensator of FIG. 12 according to one embodiment.

Figure 14:
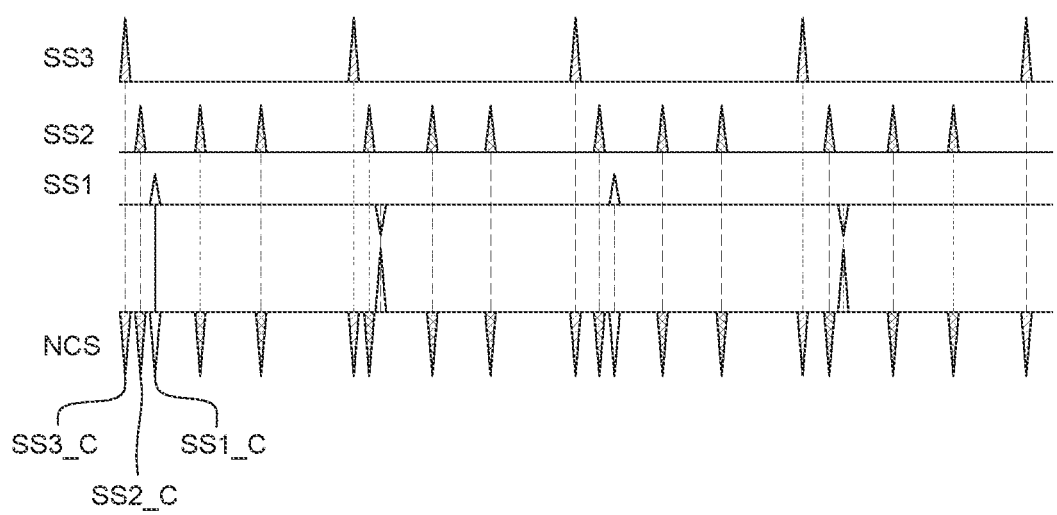
FIG. 14 is a timing diagram for explaining an example of an operation of the noise compensator of FIG. 12 according to exemplary embodiments of the present disclosure.

FIG. 14 is a timing diagram for explaining an example of an operation of the noise compensator of FIG. 12 according to one embodiment.

Figure 15:
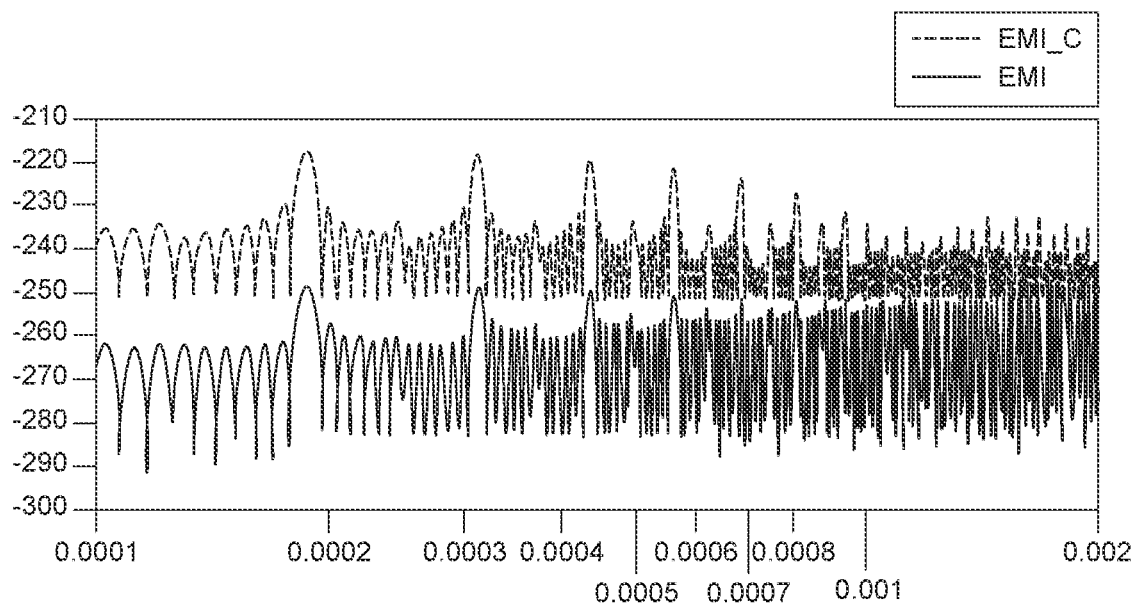
FIG. 15 is a diagram for explaining a level of electromagnetic interference in the display device according to exemplary embodiments of the present disclosure.

FIG. 15 is a diagram for explaining a level of electromagnetic interference in the display device according to exemplary embodiments of the present disclosure.

Meanwhile, in FIG. 7, minimum components for describing a configuration for generating the noise compensation signal NCS, in relation to the noise compensator NCP are illustrated.

Meanwhile, in order to avoid redundant descriptions, in FIGS. 7 to 14, the content not overlapping with the content described with reference to FIGS. 1 to 6B is mainly described, and portions not specifically described are in accordance with the embodiments described above. The same reference numerals denote the same elements, and similar numerals denote similar constituent elements.

Referring to FIGS. 1, 2, 4A, 5, and 7, the display device 1000 according to exemplary embodiments of the present disclosure may include a plurality of the common electrodes CE, the gate driver GIP, the source driving integrated circuit SIC, and the noise compensator NCP that are disposed on the active area DA (or the sensing area SA) of the display panel 100.

The plurality of common electrodes CE may be disposed in lines on the active area DA (or the sensing area SA) of the display panel 100. For example, the common electrodes CE may be disposed in a matrix form in a plurality of rows R1 to Rn (where n is an integer greater than 0) and a plurality of columns C1 to Cm (where m is an integer greater than 0).

In an exemplary embodiment, at least a portion of the common electrodes CE may be connected to first switches SW1, and at least another portion of the common electrodes CE may be connected to second switches SW2. For example, each of the common electrodes CE disposed in a first row R1 among the plurality of rows R1 to Rn may be connected to the first switch SW1, and each of the common electrodes CE disposed in an n-th row Rn may be connected to the second switch SW2.

Meanwhile, in FIG. 7, it is illustrated that the common electrodes CE disposed in the first row R1 among the plurality of rows R1 to Rn are connected to the first switches SW1, but embodiments of the present disclosure are not limited thereto. For example, the common electrodes CE disposed in any row of second to n-th rows R2 to Rn may be connected to the first switches SW1. Meanwhile, in the examples described above, when the common electrodes CE disposed in the n-th row Rn among the plurality of rows R1 to Rn are connected to the first switches SW1, the common electrodes CE disposed in any row of first to (n−1)th rows R1 to Rn−1 among the plurality of rows R1 to Rn may be connected to the second switches SW2.

Similarly, in FIG. 7, it is illustrated that the common electrodes CE disposed in the n-th row Rn among the plurality of rows R1 to Rn are connected to the second switches SW2, but embodiments of the present disclosure are not limited thereto. For example, the common electrodes CE disposed in any row of the first to (n−1)th rows R1 to Rn−1 may be connected to the second switches SW2. Meanwhile, in the examples described above, when the common electrodes CE disposed in the first row R1 among the plurality of rows R1 to Rn are connected to the second switches SW2, the common electrodes CE disposed in any row of the second to n-th rows R2 to Rn among the plurality of rows R1 to Rn may be connected to the first switches SW1.

Meanwhile, in FIG. 7, it is illustrated that the common electrodes CE disposed in one row (i.e., the first row R1) among the plurality of rows R1 to Rn are connected to the first switches SW1, but embodiments of the present disclosure are not limited thereto. For example, the common electrodes CE disposed in at least two rows among the first to n-th rows R1 to Rn may be connected to the first switches SW1. Meanwhile, in the examples described above, when the common electrodes CE disposed in at least two rows including the n-th row Rn among the plurality of rows R1 to Rn are connected to the first switches SW1, the common electrodes CE disposed in any row other than the rows in which the common electrodes CE connected to the first switches SW1 are disposed among the plurality of rows R1 to Rn may be connected to the second switches SW2.

Similarly, in FIG. 7, it is illustrated that the common electrodes CE disposed in one row (i.e., the n-th row Rn) among the plurality of rows R1 to Rn are connected to the second switches SW2, but embodiments of the present disclosure are not limited thereto. For example, the common electrodes CE disposed in at least two rows among the first to n-th rows R1 to Rn may be connected to the second switches SW2. Meanwhile, in the examples described above, when the common electrodes CE disposed in at least two rows including the first row R1 among the plurality of rows R1 to Rn are connected to the second switches SW2, the common electrodes CE disposed in any row other than the rows in which the common electrodes CE connected to the second switches SW2 are disposed among the plurality of rows R1 to Rn may be connected to the first switches SW1.

In an exemplary embodiment, each of the first switches SW1 and the second switches SW1 and SW2 may be disposed on the active area DA (or the sensing area SA). However, the exemplary embodiment of the present disclosure is not limited thereto, and at least a portion of the first switches SW1 and the second switches SW2 may be disposed on the non-active area NDA (or the non-sensing area NSA).

According to exemplary embodiments, each of the first switches SW1 and the second switches SW2 may be connected to the common electrodes CE disposed on a first area of the display panel 100 and the common electrodes CE disposed on a second area of the display panel 100. More specifically, when the active area DA of the display panel 100 is divided into an upper area and a lower area and classified into a first area and a second area (e.g., the first area corresponding to the upper area and the second area corresponding to the lower area), the first switches SW1 may be connected to the common electrodes CE disposed in at least one row (e.g., the first row R1) of rows disposed on the first area among the plurality of rows R1 to Rn, and the second switches SW2 may be connected to the common electrodes CE disposed in at least one row (e.g., the n-th row Rn) of rows disposed on the second area among the plurality of rows R1 to Rn.

According to exemplary embodiments, a row (e.g., the first row R1) in which the common electrodes CE connected to the first switches SW1 are disposed may be positioned above a row (e.g., the n-th row Rn) in which the common electrodes CE connected to the second switches SW2 are disposed, but the embodiments of the present disclosure are not limited thereto.

Meanwhile, as will be described later, the noise compensator NCP may sense noise (electromagnetic waves) generated from the multiplexer MUX through a second sensing line SL2 connected to the second switches SW2. To this end, in an exemplary embodiment, the common electrodes CE connected to the second switches SW2 may be disposed adjacent to the multiplexer MUX. For example, a row (e.g., the n-th row Rn) in which the common electrodes CE connected to the second switches SW2 are disposed among the plurality of rows R1 to Rn may be positioned adjacent to the multiplexer MUX. In this case, in order to normally detect noises (electromagnetic waves) generated by the multiplexer MUX, the common electrodes CE connected to the first switches SW1 (or the row in which the common electrodes CE connected to the first switches SW1 are disposed) may not be disposed between the common electrodes CE connected to the second switches SW2 (or the row in which the common electrodes CE connected to the second switches SW2 are disposed) and the multiplexer MUX (i.e., the common electrodes CE connected to the first switches SW1 are disposed above the common electrodes CE connected to the second switches SW2).

Meanwhile, according to exemplary embodiments, at least one row may be disposed between the row in which the common electrodes CE connected to the first switches SW1 are disposed and the row in which the common electrodes CE connected to the second switches SW2 are disposed, among the plurality of rows R1 to Rn. For example, at least one row in which the common electrodes CE not connected to any switch are disposed may be disposed between the row in which the common electrodes CE connected to the first switches SW1 are disposed and the row in which the common electrodes CE connected to the second switches SW2 are disposed, among the plurality of rows R1 to Rn. However, this is exemplary, and embodiments of the present disclosure are not limited thereto. Among the plurality of rows R1 to Rn, the row in which the common electrodes CE connected to the first switches SW1 are disposed and the row in which the common electrodes CE connected to the second switches SW2 are disposed may be disposed adjacent to each other.

Also, the first switches SW1 may be connected to a first sensing line SL1, and the second switches SW2 may be connected to the second sensing line SL2. Accordingly, when a first switch control signal of a turn-on level is provided to the first switches SW1, the first switches SW1 are turned on, and the common electrodes CE disposed in the first row R1 may be connected to the first sensing line SL1. In addition, when a second switch control signal of a turn-on level is provided to the second switches SW2, the second switches SW2 are turned on, and the common electrodes CE disposed in the n-th row Rn may be connected to the second sensing line SL2.

In an exemplary embodiment, the first switches SW1 and the second switches SW2 may be turned on during the display driving period and turned off during the touch driving period in one frame period in which the display device 1000 is driven.

For example, further referring to FIG. 8, each of a first switch control signal SWCS1 provided to the first switches SW1 and a second switch control signal SWCS2 provided to the second switches SW2 may have a turn-on level (e.g., a high level) during the display driving period DP and a turn-off level (e.g., a low level) during the touch driving period TP during the frame period.

Accordingly, the common electrodes CE respectively connected to the first switches SW1, that is, the common electrodes CE disposed in the first row R1 may be electrically connected to the first sensing line SL1 during the display driving period DP, and may be electrically opened without being connected to the first sensing line SL1 during the touch driving period TP.

Similarly, the common electrodes CE respectively connected to the second switches SW2, that is, the common electrodes CE disposed in the n-th row Rn, may be electrically connected to the second sensing line SL2 during the display driving period DP and may be electrically opened without being connected to the second sensing line SL2 during the touch driving period TP.

The noise compensator NCP may sense noise (e.g., electromagnetic waves) that may occur within the display device 1000. For example, the noise compensator NCP may receive a first sensing signal SS1 through the first sensing line SL1, and based on the first sensing signal SS1, may sense noise (electromagnetic waves) generated by the pixels PX of the display panel 100. In addition, the noise compensator NCP may receive a second sensing signal SS2 through the second sensing line SL2, and based on the second sensing signal SS2, may sense noise (electromagnetic waves) generated by the source driving integrated circuit SIC (for example, the multiplexer MUX included in the source driving integrated circuit SIC). In addition, the noise compensator NCP may receive a third sensing signal SS3 through a third sensing line SL3, and based on the third sensing signal SS3, may sense noise (electromagnetic waves) generated by the gate driver GIP.

More specifically, during the display driving period DP, the noise compensator NCP may be electrically connected to the common electrodes CE disposed in the first row R1 through the first sensing line SL1 and the turned-on first switches SW1, and receive the first sensing signal SS1 corresponding to noise (electromagnetic waves) generated from the common electrodes CE. For example, during the display driving period DP, noises (electromagnetic waves) may be generated from the pixels PX by the common voltage Vcom supplied to the common electrodes CE for display driving. Accordingly, the noise compensator NCP may receive the first sensing signal SS1 through the first sensing line SL1, and sense noise (electromagnetic waves) generated from the pixels PX during the display driving period DP.

Meanwhile, as described above, the first switches SW1 may be turned off during the touch driving period TP. This is to prevent degradation in touch driving performance by electrically connecting the common electrodes CE (i.e., the touch electrodes) to the first sensing line SL1 during the touch driving period TP since the common electrodes CE are used as the touch electrodes to which the touch driving signal TDS is applied during the touch driving period TP.

Also, during the display driving period DP, the noise compensator NCP may be electrically connected to the common electrodes CE disposed in n-th row Rn through the second sensing line SL2 and the turned-on second switches SW2 and receive the second sensing signal SS2 corresponding to noise (electromagnetic waves) generated from the common electrodes CE. For example, in the case of the multiplexer MUX, noise (electromagnetic waves) may be generated by a clock signal (e.g., a multiplexer clock signal) provided to the multiplexer MUX. Accordingly, during the display driving period DP, the noise compensator NCP may sense the noise (electromagnetic waves) generated from the multiplexer MUX through the common electrodes CE disposed in the n-th row Rn adjacent to the multiplexer MUX among the common electrodes CE. That is, during the display driving period DP, the noise compensator NCP may receive the second sensing signal SS2 through the second sensing line SL2 and sense the noise (electromagnetic waves) generated from the multiplexer MUX.

Meanwhile, as described above, the second switches SW2 may be turned off during the touch driving period TP. This is to prevent degradation in touch driving performance by electrically connecting the common electrodes CE (i.e., the touch electrodes) disposed in the n-th row Rn during the touch driving period TP to the second sensing signal SS2 since the common electrodes CE are used as the touch electrodes to which the touch driving signal TDS is applied during the touch driving period TP.

Meanwhile, as described above, the second sensing line SL2 for sensing the noises (electromagnetic waves) generated from the multiplexer MUX may be connected to the common electrodes CE disposed adjacent to the multiplexer MUX, that is, the common electrodes CE disposed in the n-th row Rn (e.g., connected during the period in which the second switch SW2 is turned on). Here, in order for the noise compensator NCP to sense noises (electromagnetic waves) generated from the pixels PX through the first sensing line SL1, it is necessary to sense the noises (electromagnetic waves) in an area (or a point) in which an influence of the noises (electromagnetic waves) generated by the multiplexer MUX is minimum. Accordingly, as described above, the first sensing line SL1 for sensing the noises (electromagnetic waves) generated from the pixels PX may be connected to the common electrodes CE disposed farthest from the multiplexer MUX, that is, the common electrodes CE disposed in the first row R1 (e.g., connected during the period in which the first switch SW1 is turned on). Accordingly, the noise described above (e.g., the noises generated from the pixels PX and the noise generated from the multiplexer MUX) may be sensed more accurately.

Also, the noise compensator NCP may receive the third sensing signal SS3 through the third sensing line SL3 and sense noises (electromagnetic waves) generated by the gate driver GIP. For example, in the case of the gate driver GIP, the noise (electromagnetic waves) may be generated by a clock signal (e.g., a gate clock signal) supplied through the gate control line GCL. Accordingly, the noise compensator NCP may sense the noises (electromagnetic waves) generated by the gate driver GIP based on the third sensing signal SS3 received through the third sensing line SL3 connected to the gate driver GIP.

Referring to FIG. 9 for a more detailed explanation, the gate driver GIP may be supplied with a first gate clock signal, a second gate clock signal, and a third gate clock signal that are necessary for generating gate signals described with reference to FIG. 1, through a first clock signal line CLKL1, a second clock signal line CLKL2, and a third clock signal line CLKL3, respectively.

Each of the first clock signal line CLKL1, second clock signal line CLKL2, and third clock signal line CLKL3 may extend in the second direction DR2 and be spaced apart from one another in the first direction DR1.

In an exemplary embodiment, a first sub-sensing line SSL1 and a second sub-sensing line SSL2 may be further disposed in the gate driver GIP. The first sub-sensing line SSL1 and the second sub-sensing line SSL2 may be spaced apart from the first clock signal line CLKL1, the second clock signal line CLKL2, and the third clock signal line CLKL3 and be disposed between the first clock signal line CLKL1, the second clock signal line CLKL2, and the third clock signal line CLKL3. For example, the first sub-sensing line SSL1 may be disposed between the first clock signal line CLKL1 and the second clock signal line CLKL2, and the second sub-sensing line SSL2 may be disposed between the second clock signal line CLKL2 and the third clock signal line CLKL3.

In addition, the first sub-sensing line SSL1 and the second sub-sensing line SSL2 may be connected to each other through contact holes (e.g., CNT1 and CNT2) penetrating at least one layer (for example, the interlayer insulating layer) disposed thereunder.

For example, further referring to FIG. 10, FIG. 10 illustrates the substrate SUB, a buffer layer BUF, a gate insulating layer GI, an interlayer insulating layer ILD, the first to third clock signal lines CLKL1, CLKL2 and CLKL3, the first and second sub-sensing lines SSL1 and SSL2, and a first connection electrode CTE1.

The substrate SUB is a base material of the display panel 100 and may be a substantially transparent light-transmissive substrate. The substrate SUB may be a flexible substrate formed of a plastic material. Here, flexible properties may be interpreted as the same meaning as bendable, unbreakable, rollable, or foldable properties or the like.

For example, the substrate SUB may include plastic, and in this case, the substrate SUB may also be referred to as a plastic film or a plastic substrate. For example, the substrate SUB may include at least one selected from the group consisting of polyester-based polymers, silicone-based polymers, acrylic-based polymers, polyolefin-based polymers, and polymers thereof. For example, the substrate SUB may include polyimide (PI).

Meanwhile, this is exemplary, and a material of the substrate SUB is not limited thereto. For example, the substrate SUB may be a rigid substrate including glass or tempered glass.

The buffer layer BUF may be disposed on the substrate SUB. Meanwhile, although not separately illustrated in FIG. 10, components for at least one thin film transistor, a storage capacitor, and a light emitting element included in each pixel PX to correspond to the active area DA of the display panel 100 may be disposed on the buffer layer BUF.

The buffer layer BUF is disposed on the substrate SUB and may serve to protect components (e.g., thin film transistors, and the like) included in the pixels PX from impurities such as alkali ions and the like, flowing out of the substrate SUB. For example, the buffer layer BUF may be formed of silicon nitride (SiNx), silicon oxide (SiOx), or multiple layers thereof. In addition, the buffer layer BUF may serve to improve adhesion between layers formed thereon and the substrate SUB, and block moisture or oxygen penetrating through the substrate SUB.

The gate insulating layer GI may be disposed on the buffer layer BUF. Meanwhile, although not separately illustrated in FIG. 10, a semiconductor layer (or a semiconductor pattern or active layer) and a gate electrode, a source electrode, and a drain electrode overlapping the semiconductor layer of the thin film transistor included in the pixel PX disposed in the active area DA may be disposed on the buffer layer BUF. The gate insulating layer GI may insulate the semiconductor layer and the gate electrode of the thin film transistor. For example, the gate insulating layer GI may include an insulating inorganic material such as silicon oxide (SiOx) or silicon nitride (SiNx), but this is exemplary. The gate insulating layer GI may include an insulating organic material in addition to the insulating material.

The first connection electrode CTE1 may be disposed on the gate insulating layer GI. The first connection electrode CTE1 may include a conductive metal material.

The interlayer insulating layer ILD may be disposed on the gate insulating layer GI. For example, the interlayer insulating layer ILD may be disposed on the gate insulating layer GI to cover the first connection electrode CTE1.

The interlayer insulating layer ILD may be configured as a single layer of silicon nitride (SiNx) or silicon oxide (SiOx) or multiple layers thereof, but is not limited thereto.

On the interlayer insulating layer ILD, the first clock signal line CLKL1, the second clock signal line CLKL2, and the third clock signal line CLKL3 may be disposed to be spaced apart from one another in the first direction DR1. The first sub-sensing line SSL1 and the second sub-sensing line SSL2 may be disposed between the first clock signal line CLKL1, the second clock signal line CLKL2, and the third clock signal line CLKL3.

The first sub-sensing line SSL1 may be electrically connected to the first connection electrode CTE1 through a first contact hole CNT1 penetrating the interlayer insulating layer ILD. Also, the second sub-sensing line SSL2 may be electrically connected to the first connection electrode CTE1 through a second contact hole CNT2 penetrating the interlayer insulating layer ILD. Accordingly, the first sub-sensing line SSL1 and the second sub-sensing line SSL2 may be electrically connected.

In addition, the first sub-sensing line SSL1 and the second sub-sensing line SSL2 may be connected to the third sensing line SL3 through contact holes (e.g., CNT3, CNT4, and CNT5) penetrating at least one layer (for example, the interlayer insulating layer) disposed thereunder.

For example, referring to FIG. 11, the third sensing line SL3 may be disposed on the interlayer insulating layer ILD to be spaced apart from the first and second sub-sensing lines SSL1 and SSL2 and the first to third clock signal lines CLKL1, CLKL2 and CLKL3. For example, the third sensing line SL3 may be disposed on one side of the first clock signal line CLKL1. In addition, a second connection electrode CTE2 may be disposed on the gate insulating layer GI. The second connection electrode CTE2 may include a conductive metal material.

The first sub-sensing line SSL1 may be electrically connected to the second connection electrode CTE2 through a third contact hole CNT3 penetrating the interlayer insulating layer ILD. Also, the second sub-sensing line SSL2 may be electrically connected to the second connection electrode CTE2 through a fourth contact hole CNT4 penetrating the interlayer insulating layer ILD. Also, the third sensing line SL3 may be electrically connected to the second connection electrode CTE2 through a fifth contact hole CNT5 penetrating the interlayer insulating layer ILD. Accordingly, the first sub-sensing line SSL1 and the second sub-sensing line SSL2 may be electrically connected to the third sensing line SL3.

As described above, through the first and second sub-sensing lines SSL1 and SSL2 disposed between the first to third clock signal lines CLKL1, CLKL2, and CLKL3 configured to supply gate clock signals that are causes of noise (electromagnetic waves) generation of the gate driver GIP, and the third sensing line SL3 electrically connected thereto, the noise compensator NCP may receive the third sensing signal SS3 and sense the noises (electromagnetic waves) generated from the gate driver GIP.

Referring back to FIG. 7, in an exemplary embodiment, the noise compensator NCP may generate noise compensation signals NCS based on the first sensing signal SS1, the second sensing signal SS2, and the third sensing signal SS3. For example, the noise compensator NCP may adjust inverse signals of each of the first sensing signal SS1, the second sensing signal SS2, and the third sensing signal SS3 to individual intensities using different gain values, and output each of the adjusted inverse signals as the noise compensation signals NCS at different times. Here, the inverse signal may mean a signal, a phase of which is inverted in one embodiment. Thus, an inverse signal of a noise signal is the noise signal having a phase that is inverted with respect to the phase of the noise signal.

Referring to FIG. 12 for a more detailed explanation, the noise compensator NCP may include a first inverting circuit IVT1, a second inverting circuit IVT2, and a third inverting circuit IVT3 in one embodiment. The first sensing signal SS1, the second sensing signal SS2, and the third sensing signal SS3 provided to the noise compensator NCP may be connected to the first inverting circuit IVT1, the second inverting circuit IVT2, and the third inverting circuit IVT3, respectively.

Each of the first inverting circuit IVT1, the second inverting circuit IVT2, and the third inverting circuit IVT3 may invert phases of the provided signals, that is, invert phases of the first sensing signal SS1, the second sensing signal SS2, and the third sensing signal SS3, and adjust intensities of the signals and output inversed signals.

For example, further referring to FIG. 13, the inverting circuit IVT (e.g., the first inverting circuit IVT1, the second inverting circuit IVT2, or the third inverting circuit IVT3) may include an inverting amplifier including an input resistance Rin, an output resistance Rout, and an amplifier OP. Accordingly, with respect to input signals IN (e.g., the first sensing signal SS1, the second sensing signal SS2, and/or the third sensing signal SS3) provided through an input terminal, phases of the signals may be inverted, and output signals OUT (e.g., a first inverted sensing signal SS1_C, a second inverted sensing signal SS2_C, and a third inverted sensing signal SS3_C) may be output through an output terminal.

Referring to FIG. 14 for a more detailed explanation, the first inverting circuit IVT1 may receive the first sensing signal SS1 and invert the phase thereof, and then, apply a first gain value K1, to thereby control an intensity (e.g., amplitude) of the signal and output the first inverted sensing signal SS1_C. For example, phases of the first sensing signal SS1 and the first inverted sensing signal SS1_C are opposite to each other, and an intensity (magnitude) of the first inverted sensing signal SS1_C may be equal to a value obtained by multiplying the intensity (magnitude) of the first sensing signal SS1 by the first gain value K1.

In addition, the second inverting circuit IVT2 may receive the second sensing signal SS2 and invert the phase thereof, and then, apply a second gain value K2, to thereby control an intensity of the signal and output the second inverted sensing signal SS2_C. For example, phases of the second sensing signal SS2 and the second inverted sensing signal SS2_C are opposite to each other, and an intensity (magnitude) of the second inverted sensing signal SS2_C may be equal to a value obtained by multiplying the intensity (magnitude) of the second sensing signal SS2 by the second gain value K2.

In addition, the third inverting circuit IVT3 may receive the third sensing signal SS3 and invert the phase thereof, and then, apply a third gain value K3, to thereby control an intensity of the signal and output the third inverted sensing signal SS3_C. For example, phases of the third sensing signal SS3 and the third inverted sensing signal SS3_C are opposite to each other, and an intensity (magnitude) of the third inverted sensing signal SS3_C may be equal to a value obtained by multiplying the intensity (magnitude) of the third sensing signal SS3_C by the third gain value K3.

As shown in FIG. 14, the amplitudes (intensities) of the first sensing signal SS1, the second sensing signal SS2, and the third sensing signal SS3 are different. The noise compensator NCP normalizes the amplitudes of the first to third sensing signals to be the same by applying the different gain values to the inverted first to third sensing signals.

Meanwhile, as described with reference to FIG. 7, the first sensing line SL1 for sensing noises (electromagnetic waves) generated from the pixels PX may be connected to the common electrodes CE disposed in a part of the common electrodes CE (e.g., the common electrodes CE disposed in the first row R1). As described above, in response to noises (electromagnetic waves) generated from some of the pixels PX (for example, pixels disposed to overlap the common electrodes CE disposed in the first row R1), the first sensing signal SS1 may be detected. In addition, since the first sensing line SL1 is connected to the common electrodes CE disposed in the first row R1, it may be longer than other sensing lines (e.g., the second sensing line SL2 and the third sensing line SL3). Accordingly, a magnitude of the first sensing signal SS1 may be attenuated while being detected through the first sensing line SL1.

In addition, as described with reference to FIGS. 7 to 11, the third sensing line SL3 for sensing noise (electromagnetic waves) generated by the gate clock signals of the gate driver GIP may be connected to the first and second sub-sensing lines SSL1 and SSL2 disposed directly between the first to third clock signal lines CLKL1, CLKL2, and CLKL3 to which the gate clock signals are provided, so that the third sensing signal SS3 may be sensed. On the other hand, the second sensing line SL2 for sensing noises (electromagnetic waves) generated by the multiplexer clock signals of the multiplexer MUX is not directly connected to the multiplexer MUX and is electrically connected to the common electrodes CE disposed on the active area DA (or the sensing area SA), so that the second sensing signal SS2 may be indirectly sensed. Accordingly, the magnitude of the second sensing signal SS2 may be less than that of the third sensing signal SS3.

As described above, the magnitudes of the first sensing signal SS1, the second sensing signal SS2, and the third sensing signal SS3 detected by the first sensing line SL1, the second sensing line SL2, and the third sensing line SL3 may be different. For example, as described above, the magnitude of the first sensing signal SS1 may be smallest amongst the sensing signals and the magnitude of the third sensing signal SS3 may be greatest amongst the sensing signals.

Accordingly, the noise compensator NCP according to exemplary embodiments of the present disclosure may apply different gain values K1, K2, and K3 and generate the first inverted sensing signal SS1_C, the second inverted sensing signal SS2_C and the third inverted sensing signal SS3_C having the same magnitude (intensity).

That is, in an exemplary embodiment, the first gain value K1, the second gain value K2, and the third gain value K3 may be different. For example, the first gain value K1 applied to the signal, the phase of which is inverted corresponding to the first sensing signal SS1 is greatest amongst the gain values. The third gain value K3 applied to the signal, the phase of which is inverted corresponding to the third sensing signal SS3 may be smallest amongst the gain values.

Meanwhile, the first gain value K1, the second gain value K2, and the third gain value K3 may be determined according to a magnitude of an output resistor Rout included in the inverting circuit IVT.

Referring back to FIG. 12, the inverted sensing signals SS1_C, SS2_C, and SS3_C output from the inverting circuits IVT1, IVT2, and IVT3 may each be the noise compensation signal NCS at different times. That is, the sensing signals SS1, SS2, and SS3 may be sensed at different times and as a result the inverting circuits IVT1, IVT2, and IVT3 each outputs its corresponding inverted sensing signal at different times. The noise compensator NCP may then output one of the inverted sensing signals as the noise compensation signal NCS. For example, the first inverting circuit IVT1 may output the inverted sensing signal SS1_C at a first time (1) and the inverted sensing signal SS1_C is the noise compensation signal NCS at the first time. The second inverting circuit IVT2 may output the inverted sensing signal SS2_C at a second time (2) that is different from the first time (1) and the inverted sensing signal SS2_C is the noise compensation signal NCS at the second time. Lastly, the third inverting circuit IVT3 may output the inverted sensing signal SS3_C at a third time (3) that is different from the first time (1) and the second time (2) and the inverted sensing signal SS3_C is the noise compensation signal NCS at the third time. Meanwhile, in this case, as described with reference to FIGS. 6A and 6B, points at which noises, that is, peaks of the sensing signals SS1, SS2, and SS3 occur, are different depending on causes of noise generation. Thus, in generating the noise compensation signal NCS the inverted sensing signals SS1_C, SS2_C, and SS3_C intensities (magnitudes) do not affect each other, so that the noise compensation signal NCS for canceling each noise (electromagnetic wave) can be normally generated.

The noise compensation signal NCS may be provided to the voltage generator VG. That is, as the noise compensation signal NCS for canceling each noise (electromagnetic wave), a noise compensation signal NCS including peak values of the inverted sensing signals SS1_C, SS2_C, and SS3_C corresponding to the inverse signals of the sensed noises may be provided to the voltage generator VG. The voltage generator VG generates a common voltage Vcom based on the noise compensation signal NCS. In one embodiment, the voltage generator VG sums a predetermined common voltage with the noise compensation signal NCS to generate the adjusted common voltage Vcom. As mentioned above, each of the inverted sensing signals SS1_C, SS2_C, and SS3_C can be the noise compensation signal NCS at different times and each has an inverted amplitude (e.g., a negative value). Thus, the voltage generator VG reduces the magnitude of the predetermined common voltage by adding the noise compensation signal NCS to the predetermined common voltage to generate the adjusted common voltage Vcom. For example, at a first time the voltage generator VG may sum the predetermined common voltage with the inverted sensing signal SS1_C at the first time to generate the adjusted common voltage Vcom at the first time. At a second time the voltage generator VG may sum the predetermined common voltage with the inverted sensing signal SS2_C at the second time to generate the adjusted common voltage Vcom at the second time. Lastly, at a third time the voltage generator VG may sum the predetermined common voltage with the inverted sensing signal SS3_C at the third time to generate the adjusted common voltage Vcom at the third time. Accordingly, the level of electromagnetic interference EMI of the display device 1000 may be reduced.

For example, referring to FIG. 15, compared to a level of electromagnetic interference EMI_C according to a comparative example in which separate noise compensation is not performed as illustrated in FIG. 15, the level of electromagnetic interference EMI can be remarkably reduced by the noise compensation signal NCS in the display device 1000 according to exemplary embodiments of the present disclosure.

In particular, the display device 1000 according to exemplary embodiments of the present disclosure may detect noises (electromagnetic waves) by using different sensing lines SL1, SL2, and SL3 according to causes of noise generation, and generate the noise compensation signals NCS based on the detected noises, thereby reducing the level of electromagnetic interference more effectively.

Figure 16:
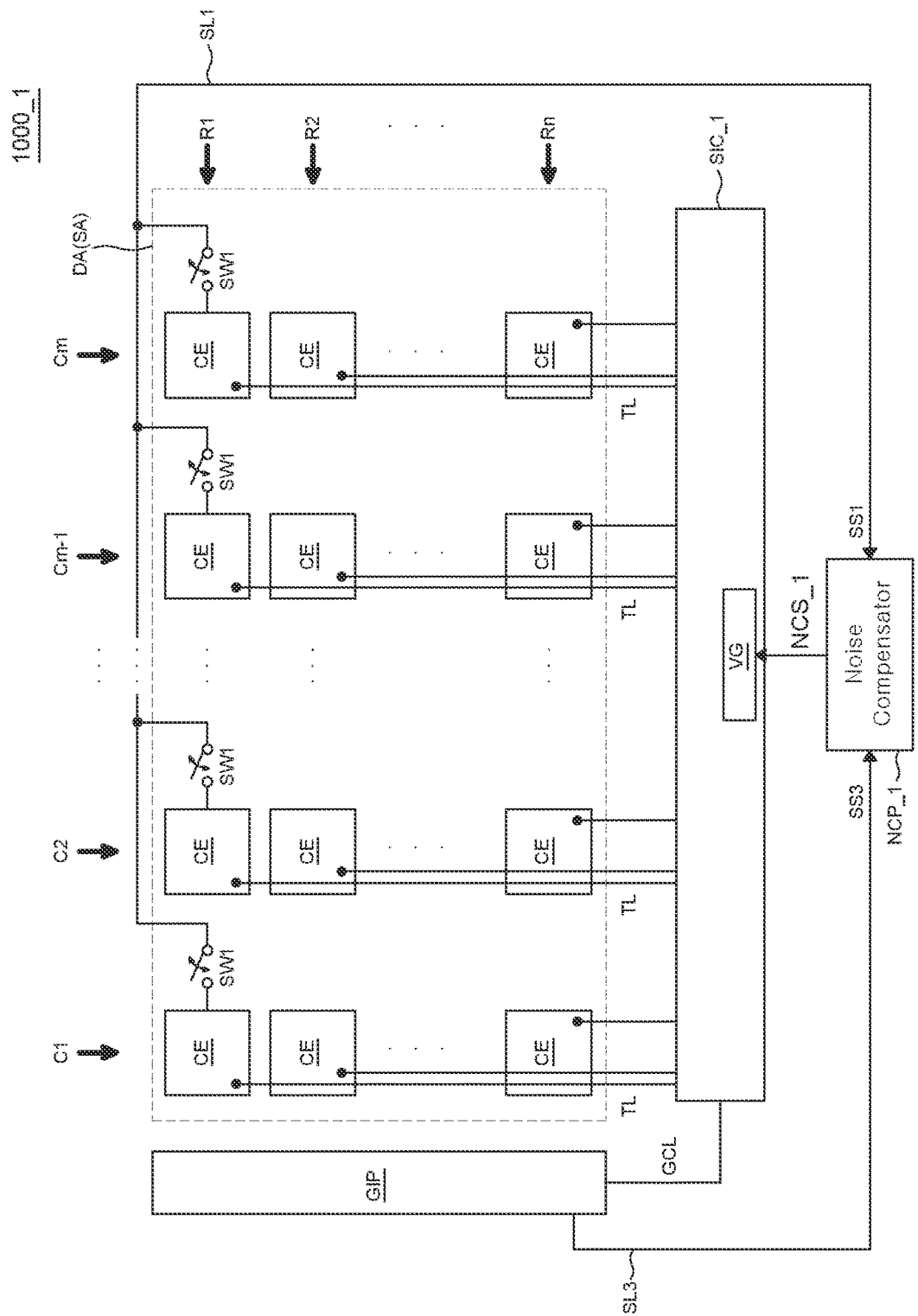
FIG. 16 is a diagram illustrating a display device according to exemplary embodiments of the present disclosure.

FIG. 16 is a diagram illustrating a display device according to exemplary embodiments of the present disclosure.

Figure 17:
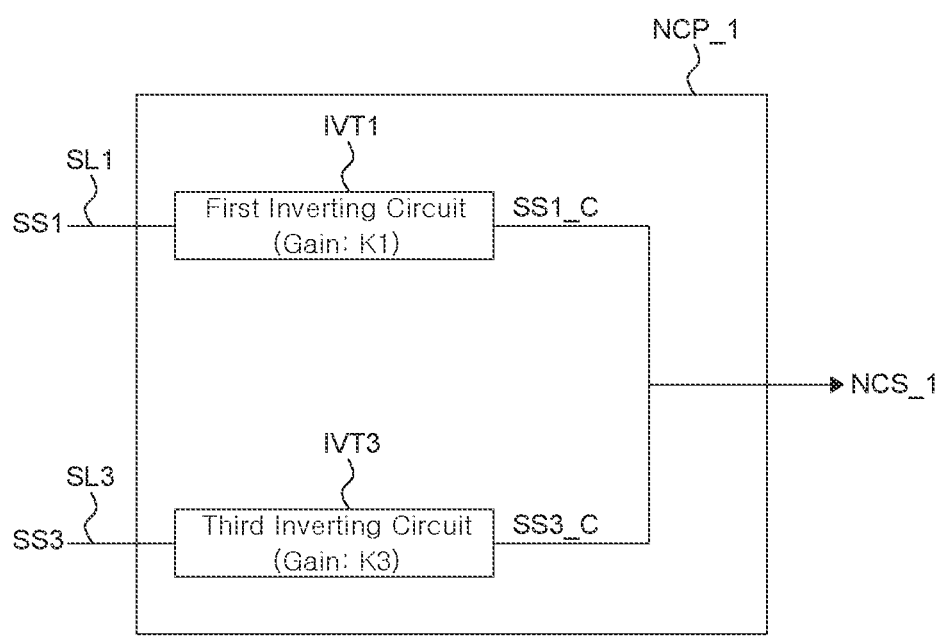
FIG. 17 is a block diagram illustrating an example of a noise compensator included in the display device of FIG. 16 according to exemplary embodiments of the present disclosure.

FIG. 17 is a block diagram illustrating an example of a noise compensator included in the display device of FIG. 16.

Meanwhile, FIGS. 16 and 17 show a modified embodiment of the exemplary embodiment described with reference to FIGS. 7 to 15, in relation to a noise compensator NCP_1. Here, parts different from the exemplary embodiments described above will be mainly described in order to avoid redundant descriptions, and parts not specifically described are in accordance with the exemplary embodiments described above. The same reference numerals denote the same elements, and similar numerals denote similar constituent elements.

Referring to FIGS. 16 and 17, a display device 1000_1 according to exemplary embodiments of the present disclosure may include the plurality of common electrodes CE, the gate driver GIP, the source driving integrated circuit SIC_1, and the noise compensator NCP_1 that are disposed on the active area DA (or the sensing area SA) of the display panel 100.

Meanwhile, in the display device 1000_1 of FIG. 16, the source driving integrated circuit SIC_1 may be the source driving integrated circuit SIC_1 described with reference to FIG. 4B. That is, the source driving integrated circuit SIC_1 included in the display device 1000_1 of FIG. 16 may not include a multiplexer.

Accordingly, the display device 1000_1 may be configured not to include a sensing line (e.g., the second sensing line SL2) for sensing noises (electromagnetic waves) generated from the multiplexer described with reference to FIG. 7.

Accordingly, as illustrated in FIGS. 16 and 17, the noise compensator NCP_1 may receive the first sensing signal SS1 and the third sensing signal SS3 at different times due to real time sensing of the first and third sensing signals SS1 and SS3, and output one of the first inverted sensing signal SS1_C and the third inverted sensing signal SS3_C that are output by the inverting circuits IVT1 and IVT3 as a noise compensation signal NCS_1 at different times due to the timing at which the sensing signals SS1 and SS3 are sensed.

For example, the first inverting circuit IVT1 may output the inverted sensing signal SS1_C at a first time (1) and the inverted sensing signal SS1_C is the noise compensation signal NCS at the first time. The third inverting circuit IVT3 may output the inverted sensing signal SS3_C at a second time (2) that is different from the first time (1) and the inverted sensing signal SS3_C is the noise compensation signal NCS at the second time.

Figure 18:
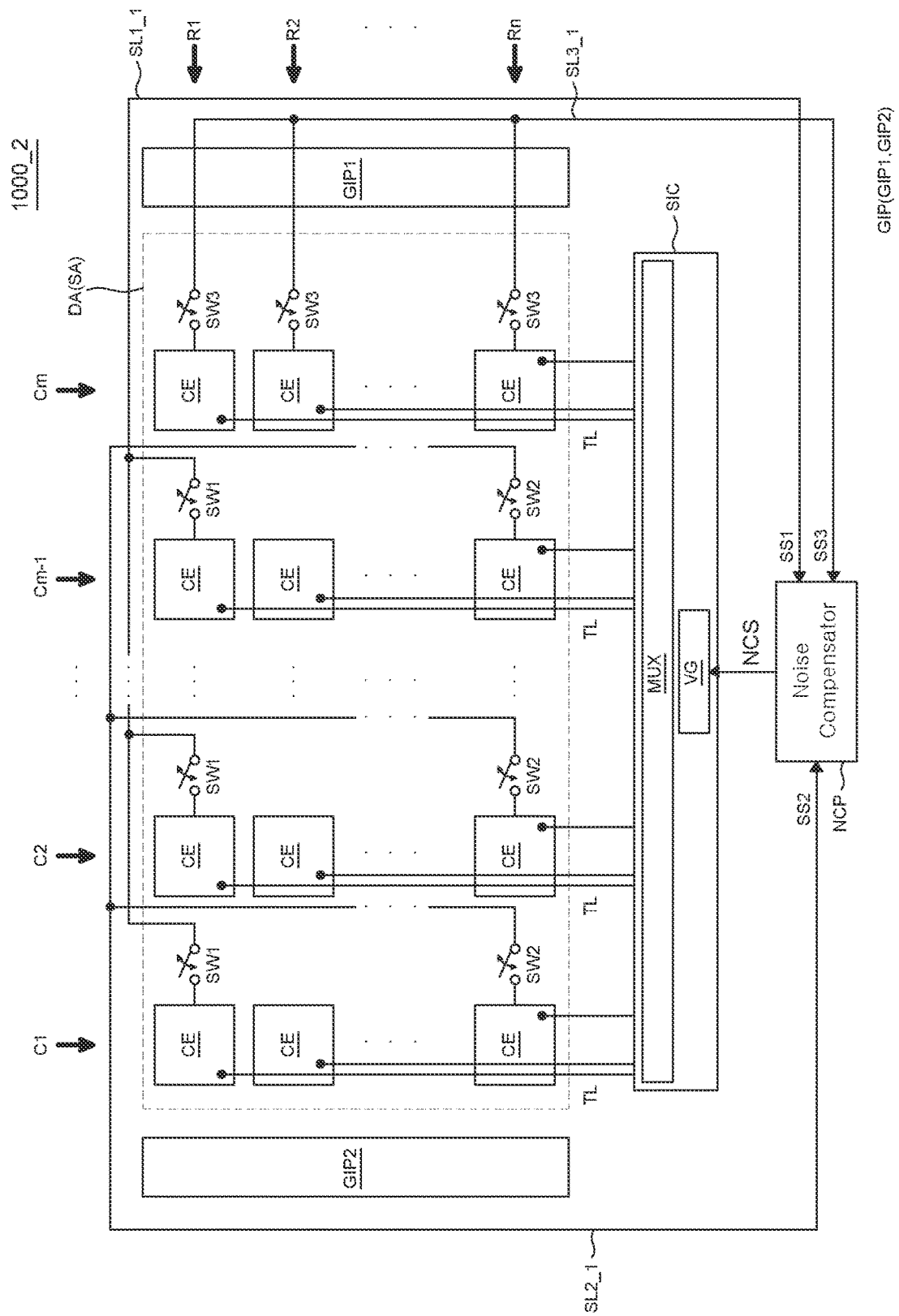
FIG. 18 is a diagram illustrating a display device according to exemplary embodiments of the present disclosure.

FIG. 18 is a diagram illustrating a display device according to exemplary embodiments of the present disclosure.

Meanwhile, FIG. 18 shows a modified embodiment of the exemplary embodiment described with reference to FIGS. 7 to 15, in relation to sensing lines SL1_1, SL2_1, and SL3_1. Here, parts different from the exemplary embodiments described above will be mainly described in order to avoid redundant descriptions, and parts not specifically described are in accordance with the exemplary embodiments described above. The same reference numerals denote the same elements, and similar numerals denote similar constituent elements.

Referring to FIG. 18, a display device 1000_2 according to exemplary embodiments of the present disclosure may include the plurality of common electrodes CE, the gate driver GIP, the source driving integrated circuit SIC, and the noise compensator NCP that are disposed on the active area DA (or the sensing area SA) of the display panel 100.

Meanwhile, in FIG. 18, the gate driver GIP included in the display device 1000_2 may be disposed on either side (e.g., a left or right side) of the active area DA or on both sides of the active area DA. Hereinafter, unless otherwise specified, descriptions are made based on that the gate driver GIP is disposed on the right side of the active area DA (shown as "GIP1" in FIG. 18), but the embodiments of the present disclosure are limited thereto.

The plurality of common electrodes CE may be disposed in lines on the active area DA (or the sensing area SA) of the display panel 100.

In an exemplary embodiment, at least a portion of the common electrodes CE may be connected to first switches SW1, at least another portion of the common electrodes CE may be connected to second switches SW2, and at least another portion of the common electrodes CE may be connected to third switches SW3.

For example, each of the common electrodes CE disposed in a first row R1 among a plurality of rows R1 to Rn and disposed in columns C1 to Cm−1 excluding an m-th column Cm which is a last column of the plurality of columns C1 to Cm may be connected to the first switches SW1. In addition, each of the common electrodes CE disposed in an n-th row Rn among the plurality of rows R1 to Rn and disposed in the columns C1 to Cm−1 excluding the m-th column Cm which is the last column of the plurality of columns C1 to Cm may be connected to the second switches SW2. Also, each of the common electrodes CE disposed in the m-th column Cm among the plurality of columns C1 to Cm may be connected to the third switch SW3.

In addition, the first switches SW1 may be connected to a first sensing line SL1_1, the second switches SW2 may be connected to a second sensing line SL2_1, and the third switches SW3 may be connected to a third sensing line SL3_1. Accordingly, when a first switch control signal of a turn-on level is provided to the first switches SW1, the first switches SW1 are turned on, and the common electrodes CE disposed in the first row R1 and first to (m−1)th columns C1 to Cm−1 may be connected to the first sensing line SL1_1. In addition, when a second switch control signal of a turn-on level is provided to the second switches SW2, the second switches SW2 are turned on, and the common electrodes CE disposed in the n-th row Rn and the first to (m−1)th columns C1 to Cm−1 may be connected to the second sensing line SL2_1. In addition, when a third switch control signal of a turn-on level is provided to the third switches SW3, the third switches SW3 are turned on, and the common electrodes CE disposed in the m-th column Cm may be connected to the third sensing line SL3_1.

In an exemplary embodiment, the first switches SW1, the second switches SW2, and the third switches SW3 may be turned on during a display driving period and turned off during a touch driving period in one frame period in which the display device 1000_2 is driven. For example, as described with reference to FIG. 8, each of the first switch control signal provided to the first switches SW1, the second switch control signal provided to the second switches SW2, and the third switch control signal provided to the third switches SW3 may have a turn-on level (e.g., a high level) during a display driving period DP of the frame period, and may have a turn-off level (e.g., a low level) during a touch driving period TP in the frame period.

Accordingly, the common electrodes CE respectively connected to the first switches SW1, that is, the common electrodes CE disposed in the first row R1 and the first to (m−1)th columns C1 to Cm−1 may be electrically connected to the first sensing line SL1_1 during the display driving period DP, and may be electrically opened without being connected to the first sensing line SL1_1 during the touch driving period TP.

Similarly, the common electrodes CE respectively connected to the second switches SW2, that is, the common electrodes CE disposed in the n-th row Rn and the first to (m−1)th columns C1 to Cm−1 may be electrically connected to the second sensing line SL2_1 during the display driving period DP, and may be electrically opened without being connected to the second sensing line SL2_1 during the touch driving period TP.

Similarly, the common electrodes CE connected to the third switches SW3, that is, the common electrodes CE disposed in the m-th column Cm may be electrically connected to the third sensing line SL3_1 during the display driving period DP and may be electrically opened without being connected to the third sensing line SL3_1 during the touch driving period TP.

In an exemplary embodiment, the noise compensator NCP may sense noises (e.g., electromagnetic waves) that may occur within the display device 1000_2. For example, the noise compensator NCP may receive the first sensing signal SS1 through the first sensing line SL1_1, and based on the first sensing signal SS1, may sense noise (electromagnetic waves) generated by the pixel PX of the display panel 100. In addition, the noise compensator NCP may receive the second sensing signal SS2 through the second sensing line SL2_2, and based on the second sensing signal SS2, may sense noise (electromagnetic waves) generated by the source driving integrated circuit SIC (e.g., the multiplexer MUX included in the source driving integrated circuit SIC). In addition, the noise compensator NCP may receive the third sensing signal SS3 through the third sensing line SL3_1, and based on the third sensing signal SS3, may sense noise (electromagnetic waves) generated by the gate driver GIP.

More specifically, substantially similarly to the content described with reference to FIG. 7, during the display driving period DP, the noise compensator NCP may be electrically connected to the common electrodes CE disposed in the first row R1 and the first to (m−1)th columns C1 to Cm−1 through the first sensing line SL1_1 and the turned-on first switches SW1, and receive the first sensing signal SS1 corresponding to noises (electromagnetic waves) generated from the common electrodes CE and detect noises (electromagnetic waves) generated from the pixels PX.

Also, during the display driving period DP, the noise compensator NCP may be electrically connected to the common electrodes CE disposed in the n-th row Rn and the first to (m−1)th columns C1 to Cm−1 through the second sensing line SL2_1 and the turned-on second switches SW2, and receive the second sensing signal SS2 corresponding to noises (electromagnetic waves) generated from the common electrodes CE and detect noises (electromagnetic waves) generated from the multiplexer MUX.

Also, during the display driving period DP, the noise compensator NCP may be electrically connected to the common electrodes CE disposed in the m-th column Cm through the third sensing line SL3_1 and the turned-on third switches SW3, and receive the third sensing signal SS3 corresponding to noises (electromagnetic waves) generated from the common electrodes CE and detect noises (electromagnetic waves) generated from the gate driver GIP.

Meanwhile, in FIG. 18, it is illustrated that the common electrodes CE disposed in the m-th column Cm among the plurality of columns C1 to Cm are connected to the third switches SW3, but embodiments of the present disclosure are limited thereto. For example, the common electrodes CE disposed in at least one row of the first to (m−1)th columns C1 to Cm−1 may be connected to the third switches SW3.

Meanwhile, in an exemplary embodiment, the common electrodes CE connected to the third switches SW3 connected to the third sensing line SL3_1 for detecting noise (electromagnetic waves) generated from the gate driver GIP may be disposed adjacent to the gate driver GIP. For example, as described above, in FIG. 18, when the gate driver GIP is disposed on the right side of the active area DA, the common electrodes CE connected to the third switches SW3 may be disposed in the m-th column Cm adjacent to the gate driver GIP.

Meanwhile, unlike this, when the gate driver GIP is disposed on the left side of the active area DA (shown as "GIP2" in FIG. 18), the common electrodes CE connected to the third switches SW3 may be disposed adjacent to the gate driver GIP. For example, the common electrodes CE connected to the third switches SW3 may be disposed in the last column C most adjacent to the gate driver GIP.

Also, as described with reference to FIG. 4A, two gate drivers GIP may be disposed on both sides of the active area DA (shown as "GIP1" and "GIP2" in FIG. 18). In this case, the common electrodes CE connected to the third switches SW3 may be disposed adjacent to one of the two gate drivers GIP. For example, the common electrodes CE connected to the third switches SW3 may be disposed adjacent to the gate driver GIP2 disposed on the right side (e.g., disposed in the m-th column Cm), or may be disposed adjacent to the gate driver GIP1 disposed on the left side (e.g., disposed in the first column C1). However, this is merely exemplary, and embodiments of the present disclosure are not limited thereto. For example, when the two gate drivers GIP are disposed on both sides of the active area DA, the common electrodes CE connected to the third switches SW3 may be disposed in two columns. For example, the common electrodes CE connected to the third switches SW3 may be disposed all of columns (e.g., the first column C1 and the m-th column C1) adjacent to each of the two gate drivers GIP disposed on the both sides.

Figure 19:
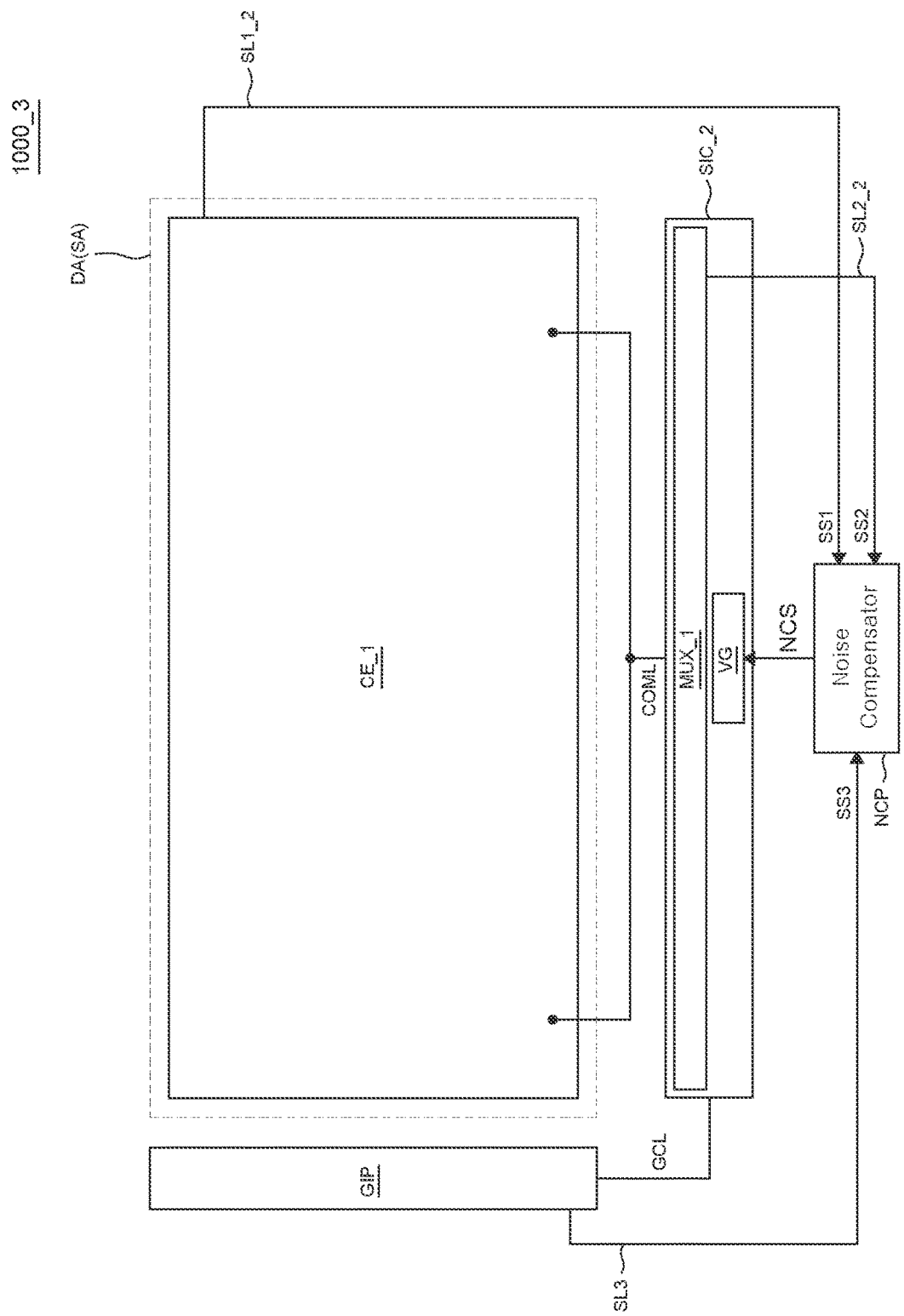
FIG. 19 is a diagram illustrating a display device according to exemplary embodiments of the present disclosure.

FIG. 19 is a diagram illustrating a display device according to exemplary embodiments of the present disclosure.

Figure 20:
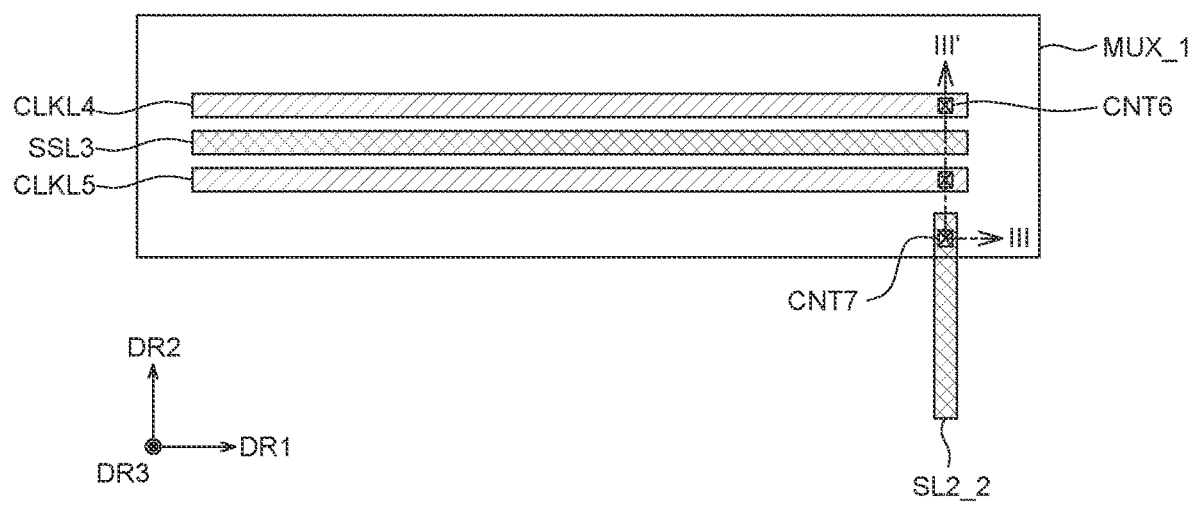
FIG. 20 is a diagram illustrating an example of a multiplexer included in the display device of FIG. 19 according to exemplary embodiments of the present disclosure.

FIG. 20 is a diagram illustrating an example of a multiplexer included in the display device of FIG. 19 according to exemplary embodiments of the present disclosure.

Figure 21:
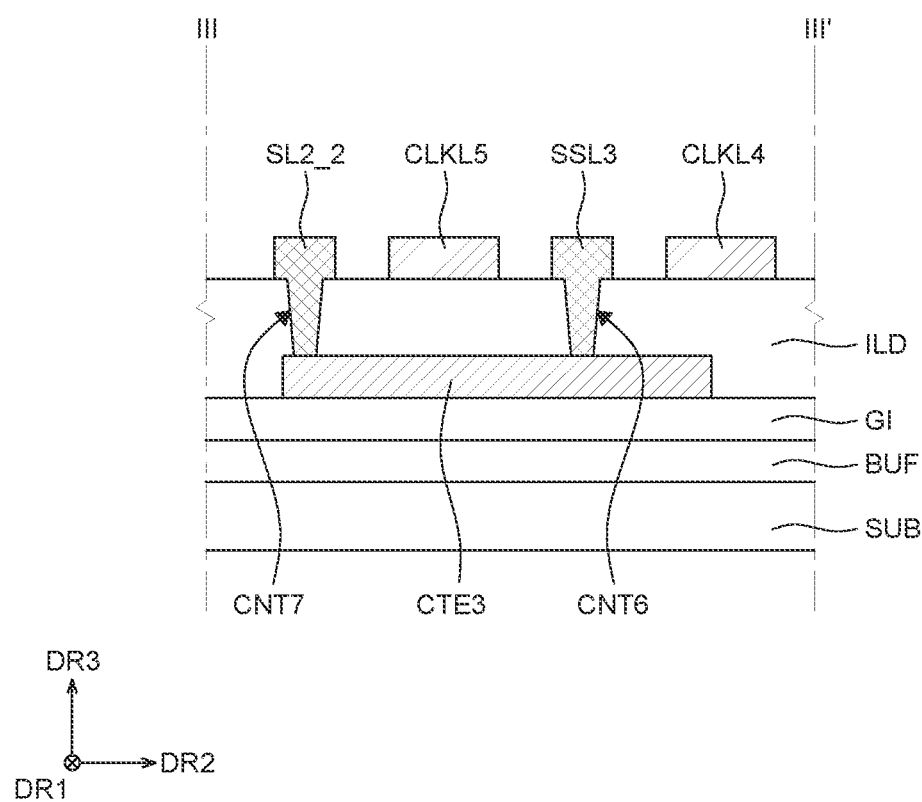
FIG. 21 is a cross-sectional view illustrating an example taken along line III-III' illustrated in FIG. 20 according to exemplary embodiments of the present disclosure.

FIG. 21 is a cross-sectional view illustrating an example taken along line III-III' illustrated in FIG. 20 according to exemplary embodiments of the present disclosure.

Meanwhile, FIGS. 19 to 21 show a modified embodiment of the exemplary embodiment described with reference to FIGS. 7 to 15, in relation to a common electrode CE_1 and a multiplexer MUX_1. Here, parts different from the exemplary embodiments described above will be mainly described in order to avoid redundant descriptions, and parts not specifically described are in accordance with the exemplary embodiments described above. The same reference numerals denote the same elements, and similar numerals denote similar constituent elements.

Meanwhile, a display device 1000_3 of FIG. 19 may not include a touch panel implemented to be embedded in the aforementioned in-cell touch method (e.g., the advanced in-cell touch (AIT) method). That is, the common electrode CE_1 included in the display device 1000_3 is used as an electrode for applying the common voltage Vcom for display driving and may not be used as a touch electrode for applying the touch driving signal TDS.

The display device 1000_3 according to exemplary embodiments of the present disclosure may include the common electrode CE_1, the gate driver GIP, a source driving integrated circuit SIC_2, and the noise compensator NCP that are disposed on the active area DA (or the sensing area SA) of the display panel 100.

The common electrode CE_1 may be disposed on the active area DA (or the sensing area SA) of the display panel 100. The common electrode CE_1 may be connected to the source driving integrated circuit SIC_2 (e.g., the voltage generator VG included in the source driving integrated circuit SIC_2) through a common voltage line COML, and receive a common voltage Vcom.

Meanwhile, in FIG. 19, although it is illustrated that one common electrode CE_1 is disposed on the active area DA, this is merely exemplary, and embodiments of the present disclosure are not limited thereto. For example, at least two common electrodes CE_1 may be disposed on the active area DA.

In an exemplary embodiment, the common electrode CE_1 may be connected to a first sensing line SL1_2. Accordingly, the noise compensator NCP may receive the first sensing signal SS1 through the first sensing line SL1_2 electrically connected to the common electrode CE_1, and detect noise (electromagnetic waves) generated from the pixels PX among noises that may occur in the display device 1000_3.

Also, the noise compensator NCP may receive the second sensing signal SS2 through a second sensing line SL2_2 and sense noise (electromagnetic waves) generated by the multiplexer MUX_1.

For example, in the case of the multiplexer MUX_1, noises (electromagnetic waves) may be generated by a clock signal (e.g., a multiplexer clock signal) supplied to the multiplexer MUX_1. Accordingly, the noise compensator NCP may sense the noises (electromagnetic waves) generated by the multiplexer (MUX_1) based on the second sensing signal SS2 received through the second sensing line SL2_2 connected to the multiplexer MUX_1.

Referring to FIG. 20 for a more detailed description, the multiplexer MUX_1 may be supplied with a first multiplexer clock signal and a second multiplexer clock signal that are necessary for driving (operation) through a fourth clock signal line CLKL4 and a fifth clock signal line CLKL5, respectively.

Each of the fourth clock signal line CLKL4 and the fifth clock signal line CLKL5 extends in the first direction DR1 and may be spaced apart from each other in the second direction DR2.

In an exemplary embodiment, a third sub-sensing line SSL3 may be further disposed in the multiplexer MUX_1. The third sub-sensing line SSL3 may be spaced apart from the fourth clock signal line CLKL4 and the fifth clock signal line CLKL5 and disposed between the fourth clock signal line CLKL4 and the fifth clock signal line CLKL5. For example, the third sub-sensing line SSL3 may be disposed between the fourth clock signal line CLKL4 and the fifth clock signal line CLKL5.

In addition, the third sub-sensing line SSL3 may be connected to the second sensing line SL2_2 through contact holes (e.g., CNT6 and CNT7) penetrating at least one layer (for example, the interlayer insulating layer) disposed thereunder.

For example, further referring to FIG. 21, FIG. 21 illustrates the substrate SUB, the buffer layer BUF, the gate insulating layer GI, the interlayer insulating layer ILD, the fourth and fifth clock signal lines CLKL4 and CLKL5, the third sub-sensing line SSL3, and a third connection electrode CTE3.

The third connection electrode CTE3 may be disposed on the gate insulating layer GI. The third connection electrode CTE3 may include a conductive metal material.

On the interlayer insulating layer ILD, the fourth clock signal line CLKL4 and the fifth clock signal line CLKL5 may be disposed to be spaced apart from each other in the second direction DR2, and the third sub-sensing line SSL3 may be disposed between the fourth clock signal line CLKL4 and the fifth clock signal line CLKL5.

The second sensing line SL2_2 may be disposed on the interlayer insulating layer ILD to be spaced apart from the third sub-sensing line SSL3 and the fourth and fifth clock signal lines CLKL4 and CLKL5. For example, the second sensing line SL2_2 may be disposed on one side of the fifth clock signal line CLKL5.

The third sub-sensing line SSL3 may be electrically connected to the third connection electrode CTE3 through a sixth contact hole CNT6 penetrating the interlayer insulating layer ILD. Also, the second sensing line SL2_2 may be electrically connected to the third connection electrode CTE3 through a seventh contact hole CNT7 penetrating the interlayer insulating layer ILD. Accordingly, the third sub-sensing line SSL3 may be electrically connected to the second sensing line SL2_2.

As described above, through the third sub-sensing line SSL3 disposed between the fourth and fifth clock signal lines CLKL4 and CLKL5 for configured to supply a multiplexer clock signal, which is a cause of noise (electromagnetic wave) generation of the multiplexer MUX_1, and the second sensing line SL2_2 electrically connected to the third sub-sensing line SSL3, the noise compensator NCP may receive the second sensing signal SS2 and sense noises (electromagnetic waves) generated from the multiplexer MUX_1.

Also, the noise compensator NCP may receive the third sensing signal SS3 through the third sensing line SL3 and sense noises (electromagnetic waves) generated by the gate driver GIP. Since this is substantially the same as or similar to the content described with reference to FIG. 7, duplicate descriptions will not be repeated.

Figure 22:
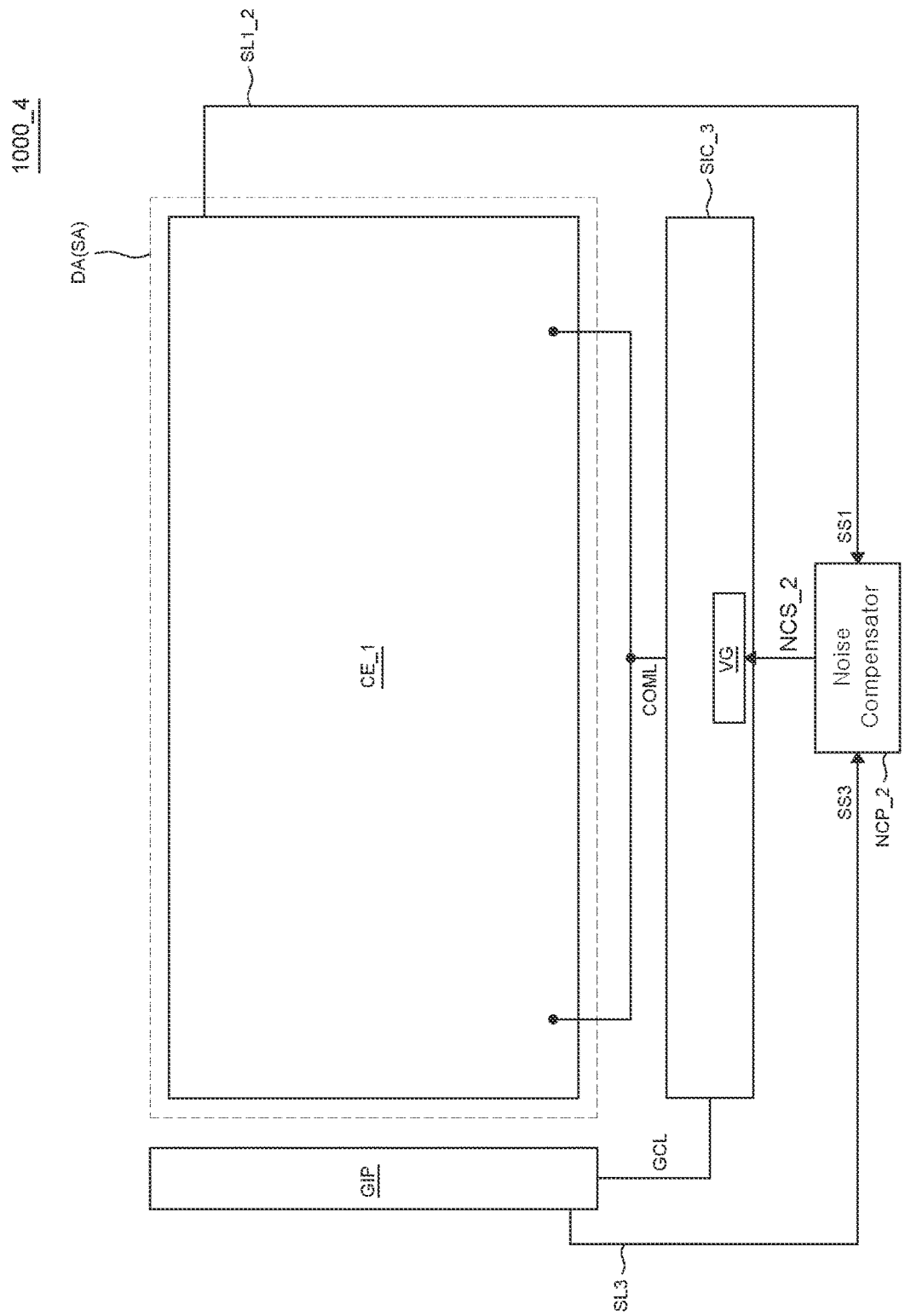
FIG. 22 is a diagram illustrating a display device according to exemplary embodiments of the present disclosure.

FIG. 22 is a diagram illustrating a display device according to exemplary embodiments of the present disclosure.

Meanwhile, FIG. 22 illustrates a modified embodiment of the exemplary embodiment described with reference to FIGS. 19 to 21, in relation to a noise compensator NCP_2. Here, parts different from the exemplary embodiments described above will be mainly described in order to avoid redundant descriptions, and parts not specifically described are in accordance with the exemplary embodiments described above. The same reference numerals denote the same elements, and similar numerals denote similar constituent elements.

Referring to FIG. 22, a display device 1000_4 according to exemplary embodiments of the present disclosure may include the common electrode CE_1, the gate driver GIP, a source driving integrated circuit SIC_3, and the noise compensator NCP_2 that are disposed on the active area DA (or the sensing area SA) of the display panel 100.

Meanwhile, in the display device 1000_4 of FIG. 22, the source driving integrated circuit SIC_3 may be substantially the same as the source driving integrated circuit SIC_1 described with reference to FIG. 4B. That is, the source driving integrated circuit SIC_3 included in the display device 1000_4 of FIG. 22 may not include a multiplexer.

Accordingly, the display device 1000_4 may be configured not to include a sensing line (e.g., the second sensing line SL2_2) for sensing noises (electromagnetic waves) generated from the multiplexer described with reference to FIGS. 19 to 21.

Accordingly, as illustrated in FIG. 22, the noise compensator NCP_2 may receive the first sensing signal SS1 and the third sensing signal SS3 at different times due to the real time sensing of the first sensing signal SS1 and the third sensing signal SS3, and output one of the first inverted sensing signal SS1_C and the third inverted sensing signal SS3_C that are output by the inverting circuits (for example, the first and third inverting circuits IVT1 and IVT3) as the noise compensation signal NCS_2 at different times due to the timing at which the sensing signals SS1 and SS3 are sensed. For example, the first inverting circuit IVT1 may output the inverted sensing signal SS1_C at a first time (1) and the inverted sensing signal SS1_C is the noise compensation signal NCS at the first time. The third inverting circuit IVT3 may output the inverted sensing signal SS3_C at a second time (2) that is different from the first time (1) and the inverted sensing signal SS3_C is the noise compensation signal NCS at the second time.

As described above, the display device according to the exemplary embodiments of the present disclosure can sense noises generated from each of causes of noise generation (e.g., the pixels, the gate driver, and/or the multiplexer) by using the plurality of sensing lines and can generate noise compensation signals for canceling the noises by applying different gain values thereto. Accordingly, the level of electromagnetic interference can be more effectively reduced.

The exemplary embodiments of the present disclosure can also be described as follows:

A display device according to an exemplary embodiment of the present disclosure may include a display panel including an active area in which a plurality of pixels and at least one common electrode overlapping at least a portion of the pixels are disposed; a gate driver configured to supply a gate signal to the pixels; a source driving integrated circuit configured to supply a data signal to the pixels and configured to supply a common voltage to the common electrode; and a noise compensator configured to receive a plurality of sensing signals from a plurality of sensing lines, generating a plurality of inverted sensing signals by applying different gain values to signals obtained by inverting phases of each of the sensing signals, and generating a noise compensation signal based on the inverted sensing signals.

A plurality of common electrodes may be disposed in first to n-th rows (where n is an integer greater than 0) and first to m-th columns (where m is an integer greater than 0) in the active area.

the plurality of sensing lines may include a first sensing line, a second sensing line, and a third sensing lines, the first sensing line may be connected to common electrodes disposed in the first row among the common electrodes, the second sensing line may be connected to common electrodes disposed in the n-th row among the common electrodes, and the third sensing line may be connected to the gate driver.

The display device may further comprise a plurality of first switches respectively disposed between the first sensing line and the common electrodes disposed in the first row; and a plurality of second switches respectively disposed between the second sensing line and the common electrodes disposed in the n-th row.

One frame period includes a display driving period in which the common voltage is supplied to the common electrodes and a touch driving period in which a touch driving signal is supplied to the common electrodes, and each of the first switches and the second switches may be turned on during the display driving period and turned off during the touch driving period.

The display device may further comprise first to third clock signal lines configured to supply gate clock signals to the gate driver and disposed to be spaced apart from one another; and first and second sub-sensing lines disposed between the first to third clock signal lines, the first and second sub-sensing lines are electrically connected to the third sensing line.

The display device may further comprises a substrate; a buffer layer disposed on the substrate; a gate insulating layer disposed on the buffer layer; a first connection electrode and a second connection electrode disposed on the gate insulating layer; and an interlayer insulating layer disposed on the gate insulating layer to cover the first connection electrode and the second connection electrode, and the first to third clock signal lines and the first and second sub-sensing lines may be disposed on the interlayer insulating layer to be spaced apart from one another.

The first sub-sensing line may be connected to the first connection electrode through a first contact hole penetrating the interlayer insulating layer, and the second sub-sensing line is connected to the first connection electrode through a second contact hole penetrating the interlayer insulating layer.

The first sub-sensing line may connected to the second connection electrode through a third contact hole penetrating the interlayer insulating layer, the second sub-sensing line is connected to the second connection electrode through a fourth contact hole penetrating the interlayer insulating layer, and the third sensing line may connected to the second connection electrode through a fifth contact hole penetrating the interlayer insulating layer.

The noise compensator may include a first inverting circuit configured to receive a first sensing signal from the first sensing line, and outputting a first inverted sensing signal by applying a first gain value to a signal obtained by inverting a phase of the first sensing signal; a second inverting circuit configured to receive a second sensing signal from the second sensing line, and outputting a second inverted sensing signal by applying a second gain value to a signal obtained by inverting a phase of the second sensing signal; a third inverting circuit configured to receive a third sensing signal from the third sensing line, and outputting a third inverted sensing signal by applying a third gain value to a signal obtained by inverting a phase of the third sensing signal and output each of the first to third inverted sensing signals as the noise compensation signal at different times.

The first gain value may be greatest and the third gain value is smallest among the first to third gain values.

The plurality of sensing lines may include a first sensing line, a second sensing line, and a third sensing lines, And the first sensing line may be connected to common electrodes disposed in the first row and first to (m−1)th columns among the common electrodes, and the second sensing line is connected to common electrodes disposed in the n-th row and first to (m−1)th columns among the common electrodes, and the third sensing line may be connected to common electrodes disposed in the m-th column among the common electrodes.

The display device may further comprise a plurality of first switches respectively disposed between the first sensing line and the common electrodes disposed in the first row and the first to (m−1)th columns; a plurality of second switches respectively disposed between the second sensing line and the common electrodes disposed in the n-th row and the first to (m−1)th columns; and a plurality of third switches respectively disposed between the third sensing line and the common electrodes disposed in the m-th column.

One frame period may include a display driving period in which the common voltage may be supplied to the common electrodes and a touch driving period in which a touch driving signal is supplied to the common electrodes, and each of the first switches, the second switches, and the third switches is turned on during the display driving period and turned off during the touch driving period.

The plurality of sensing lines may include a first sensing line, a second sensing line, and a third sensing lines, wherein the first sensing line is connected to the at least one common electrode, the second sensing line may be connected to a multiplexer included in the source driving integrated circuit, and the third sensing line is connected to the gate driver.

The display device may further comprise fourth and fifth clock signal lines configured to supply multiplexer clock signals to the multiplexer and disposed to be spaced apart from each other; and a third sub-sensing line disposed between the fourth and fifth clock signal lines, the third sub-sensing line is electrically connected to the second sensing line.

The display device may further comprise a substrate; a buffer layer disposed on the substrate; a gate insulating layer disposed on the buffer layer; a third connection electrode disposed on the gate insulating layer; and an interlayer insulating layer disposed on the gate insulating layer to cover the third connection electrode, and the fourth and fifth clock signal lines and the third sub-sensing line are disposed on the interlayer insulating layer to be spaced apart from each other.

The third sub-sensing line may be connected to the third connection electrode through a sixth contact hole penetrating the interlayer insulating layer, and the second sensing line may be connected to the third connection electrode through a seventh contact hole penetrating the interlayer insulating layer.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:
   a display panel including a plurality of pixels and at least one common electrode overlapping at least a portion of the plurality of pixels in an active area of the display panel;
   a gate driver configured to supply a gate signal to the plurality of pixels;
   a source driving integrated circuit configured to supply a data signal to the plurality of pixels and configured to supply a common voltage to the common electrode; and
   a noise compensator circuit configured to receive a plurality of sensing signals from a plurality of sensing lines that are connected to at least one of the display panel, the gate driver, or the source driving integrated circuit, generate a plurality of inverted sensing signals by applying different gain values to signals obtained by inverting phases of each of the plurality of sensing signals, and generate a noise compensation signal based on at least one of the plurality of inverted sensing signals,
   wherein the plurality of sensing lines comprise a first sensing line, a second sensing line, and a third sensing line,
   wherein the noise compensator circuit comprises:
     a first inverting circuit configured to receive a first sensing signal from the first sensing line, and output a first inverted sensing signal by applying a first gain value to a signal obtained by inverting a phase of the first sensing signal;
     a second inverting circuit configured to receive a second sensing signal from the second sensing line, and output a second inverted sensing signal by applying a second gain value to a signal obtained by inverting a phase of the second sensing signal;
     a third inverting circuit configured to receive a third sensing signal from the third sensing line, and output a third inverted sensing signal by applying a third gain value to a signal obtained by inverting a phase of the third sensing signal,
   wherein the noise compensation signal is at least one of the first inverted sensing signal at a first time, the second inverted sensing signal at a second time, and the third inverted sensing signal at a third time.

2. The display device of claim 1, wherein the at least one common electrode includes a plurality of common electrodes that are arranged in a plurality of rows of common electrodes and a plurality of columns of common electrodes in the active area.

3. The display device of claim 2, wherein the first sensing line is connected to a first row of common electrodes from the plurality of rows of common electrodes that is farthest from the source driving integrated circuit, the second sensing line is connected to a second row of common electrodes from the plurality of rows of common electrodes that is closest to the source driving integrated circuit, and the third sensing line is connected to the gate driver.

4. The display device of claim 3, further comprising:
a plurality of first switches, each first switch between the first sensing line and a corresponding common electrode from the first row of common electrodes; and
a plurality of second switches, each second switch between the second sensing line and a corresponding common electrode from the second row of common electrodes.

5. The display device of claim 4, wherein one frame period includes a display driving period during which the common voltage is supplied to the plurality of common electrodes and a touch driving period during which a touch driving signal is supplied to the plurality of common electrodes, and
wherein the plurality of first switches and the plurality of second switches are turned on during the display driving period and turned off during the touch driving period.

6. The display device of claim 3, further comprising:
a plurality of clock signal lines configured to supply gate clock signals to the gate driver, the plurality of clock signal lines including a first clock signal line, a second clock signal line, and a third clock signal line that are spaced apart from each another; and
a plurality of sub-sensing lines that are electrically connected to the third sensing line, the plurality of sub-sensing lines including a first sub-sensing that is between the first clock signal line and the second clock signal line, and a second sub-sensing line between the second clock signal line and the third clock signal line.

7. The display device of claim 3, wherein the first gain value is greater than the second gain value and the third gain value, and the third gain value is smaller than the first gain value and the second gain value.

8. The display device of claim 2, wherein the first sensing line is connected to a first row of common electrodes from the plurality of rows of common electrodes that is farthest from the source driving integrated circuit except for a common electrode from the first row that is included in a last column of common electrodes from the plurality of columns of common electrodes, the second sensing line is connected to a second row of common electrodes from the plurality of rows of common electrodes that is closest to the source driving integrated circuit except for a common electrode from the second row that is included in the last column of common electrodes, and the third sensing line is connected to column electrodes included in the last column of common electrodes.

9. The display device of claim 8, further comprising:
a plurality of first switches, each first switch between the first sensing line and a corresponding common electrode from the first row of common electrodes except for the common electrode from the first row that is included in the last column of common electrodes;
a plurality of second switches, each second switch between the second sensing line and a corresponding common electrode from the second row of common electrodes except for the common electrode from the second row that is included in the last column of common electrodes; and
a plurality of third switches, each third switch between the third sensing line and a corresponding common electrode from the last column of common electrodes.

10. The display device of claim 9, wherein one frame period includes a display driving period during which the common voltage is supplied to the plurality of common electrodes and a touch driving period during which a touch driving signal is supplied to the plurality of common electrodes, and
wherein each of the plurality of first switches, the plurality of second switches, and the plurality of third switches is turned on during the display driving period and turned off during the touch driving period.

11. The display device of claim 1, wherein the first sensing line is connected to the at least one common electrode, the second sensing line is connected to a multiplexer included in the source driving integrated circuit, and the third sensing line is connected to the gate driver.

12. The display device of claim 11, further comprising:
a plurality of clock signal lines configured to supply multiplexer clock signals to the multiplexer, the plurality of clock signal lines including a first clock signal line and a second clock signal line spaced apart from the first clock signal line; and
a third sub-sensing line that is electrically connected to the second sensing line, the third sub-sensing line between the first clock signal line and the second clock signal line.

13. A display device comprising:
a display panel including a plurality of pixels and a common electrode overlapping the plurality of pixels;
a gate driver configured to supply a gate signal to the plurality of pixels;
a source driving integrated circuit configured to supply a data signal to the plurality of pixels and configured to supply a common voltage to the common electrode;
a plurality of sensing lines, each sensing line connected to a different part of the display device; and
a noise compensator circuit configured to receive a plurality of sensing signals indicative of noise at different parts of the display device from the plurality of sensing lines and generate a noise compensation signal based on the plurality of sensing signals,
wherein the common voltage supplied to the common electrode is adjusted based on the noise compensation signal,
wherein the plurality of sensing signals include at least one of a first sensing signal indicative of noise generated by the plurality of pixels, a second sensing signal indicative of noise generated by the source driving integrated circuit, and a third sensing signal indicative of noise generated by the gate driver,
wherein the common electrode includes a plurality of common electrodes that are arranged in a plurality of rows of common electrodes and a plurality of columns of common electrodes, and the plurality of sensing lines including a first sensing line configured to receive the first sensing signal from a first row of common electrodes from the plurality of rows of common electrodes that is farthest from the source driving integrated circuit, a second sensing line configured to receive the second sensing signal from a second row of common electrodes from the plurality of rows of common electrodes that is closest to the source driving integrated circuit, and a third sensing line configured to receive the third sensing signal from the gate driver.

14. The display device of claim 13, wherein the noise compensator circuit generates the noise compensation signal by applying different gain values to signals obtained by inverting phases of each of the plurality of sensing signals, and at least one of the inverted sensing signals is the noise compensation signal.

15. The display device of claim 13, further comprising:
a plurality of first switches, each first switch between the first sensing line and a corresponding common electrode from the first row of common electrodes; and
a plurality of second switches, each second switch between the second sensing line and a corresponding common electrode from the second row of common electrodes.

16. The display device of claim 13, further comprising:
a plurality of clock signal lines configured to supply gate clock signals to the gate driver, the plurality of clock signal lines including a first clock signal line, a second clock signal line, and a third clock signal line that are spaced apart from each another; and
a plurality of sub-sensing lines that are electrically connected to the third sensing line to supply the third sensing signal to the third sensing line, the plurality of sub-sensing lines including a first sub-sensing that is between the first clock signal line and the second clock signal line, and a second sub-sensing line between the second clock signal line and the third clock signal line.

17. The display device of claim 13, wherein the noise compensator circuit comprises:
a first inverting circuit configured to receive the first sensing signal from the first sensing line, and output a first inverted sensing signal by applying a first gain value to a signal obtained by inverting a phase of the first sensing signal;
a second inverting circuit configured to receive the second sensing signal from the second sensing line, and output a second inverted sensing signal by applying a second gain value to a signal obtained by inverting a phase of the second sensing signal;
a third inverting circuit configured to receive the third sensing signal from the third sensing line, and output a third inverted sensing signal by applying a third gain value to a signal obtained by inverting a phase of the third sensing signal,
wherein the noise compensation signal is at least one of the first inverted sensing signal at a first time, the second inverted sensing signal at a second time, and the third inverted sensing signal at a third time.

18. The display device of claim 17, wherein the first inverted sensing signal, the second inverted sensing signal, and the third inverted sensing signal have a same amplitude.

19. A display device comprising:
a display panel including a plurality of pixels and a common electrode overlapping the plurality of pixels;
a gate driver configured to supply a gate signal to the plurality of pixels;
a source driving integrated circuit configured to supply a data signal to the plurality of pixels and configured to supply a common voltage to the common electrode;
a plurality of sensing lines connected to different parts of the display device; and
a noise compensator circuit configured to receive a plurality of sensing signals that have different amplitudes from the plurality of sensing lines and normalize the plurality of sensing signals to have a same amplitude, and generate a noise compensation signal based on at least one the normalized plurality of sensing signals,
wherein the common voltage supplied to the common electrode is adjusted based on the noise compensation signal,
wherein the plurality of sensing signals include at least one of a first sensing signal indicative of noise generated by the plurality of pixels, a second sensing signal indicative of noise generated by the source driving integrated circuit, and a third sensing signal indicative of noise generated by the gate driver,
wherein the common electrode includes a plurality of common electrodes that are arranged in a plurality of rows of common electrodes and a plurality of columns of common electrodes, and the plurality of sensing lines including a first sensing line configured to receive the first sensing signal from a first row of common electrodes from the plurality of rows of common electrodes that is farthest from the source driving integrated circuit, a second sensing line configured to receive the second sensing signal from a second row of common electrodes from the plurality of rows of common electrodes that is closest to the source driving integrated circuit, and a third sensing line configured to receive the third sensing signal from the gate driver.

* * * * *